United States Patent
Ruan et al.

(10) Patent No.: US 12,468,189 B2
(45) Date of Patent: Nov. 11, 2025

(54) POLARIZER AND ARRAY, POLARIZATION-CONTROLLABLE METHOD AND APPARATUS, AND ELECTRONIC DEVICE CONTROLLING A STATE OF CONNECTIVITY

(71) Applicant: HUAWEI TECHNOLOGIES CO., LTD., Guangdong (CN)

(72) Inventors: Wangchao Ruan, Dongguan (CN); Ruihua Li, Shenzhen (CN); Qingping Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/167,142

(22) Filed: Feb. 10, 2023

(65) Prior Publication Data

US 2023/0185125 A1    Jun. 15, 2023

Related U.S. Application Data

(63) Continuation of application No. PCT/CN2021/103014, filed on Jun. 29, 2021.

(30) Foreign Application Priority Data

Aug. 14, 2020   (CN) .......................... 202010818917.8

(51) Int. Cl.
  *G02F 1/1335* (2006.01)
  *G02F 1/1337* (2006.01)
(52) U.S. Cl.
  CPC .. *G02F 1/133531* (2021.01); *G02F 1/133541* (2021.01); *G02F 1/133788* (2013.01)

(58) Field of Classification Search
  CPC .......................... G02F 1/1347; G02F 1/133531
  See application file for complete search history.

(56) References Cited

U.S. PATENT DOCUMENTS

| | | | |
|---|---|---|---|
| 8,023,052 B1 | 9/2011 | Osterman et al. | |
| 2015/0029389 A1* | 1/2015 | Masanori | G02F 1/0136 348/373 |

FOREIGN PATENT DOCUMENTS

| | | | |
|---|---|---|---|
| CN | 1576907 A | 2/2005 | |
| CN | 2006-10058968 | * 11/2006 | G02D 1/133 |

(Continued)

OTHER PUBLICATIONS

Ying Zhang, Huijie Zhao, and Na Li, "Polarization calibration with large apertures in full field of view for a full Stokes imaging polarimeter based on liquid-crystal variable retarders," Appl. Opt. 52, 1284-1292 (2013).

(Continued)

*Primary Examiner* — Lauren Nguyen

(57) ABSTRACT

A polarizer, a polarizer array, a polarization-controllable method and apparatus, and an electronic device are disclosed. The polarizer includes multiple types of polarization units, each polarization unit includes a first liquid crystal cell and a second liquid crystal cell that are laminated, each liquid crystal cell includes a liquid crystal layer and an alignment film, and the alignment film is connected to an electrode layer configured to apply an external voltage to the liquid crystal layer. The first liquid crystal cell and the second liquid crystal cell of each polarization unit may be separately controlled as "connected" or "disconnected", and orientations of alignment films of first liquid crystal cells between all the multiple types of polarization units are (Continued)

different. In a same polarization unit, when one liquid crystal cell is in an on state, emergent light of the polarization unit is polarized light in one polarization direction.

18 Claims, 17 Drawing Sheets

(56) References Cited

FOREIGN PATENT DOCUMENTS

| | | |
|---|---|---|
| CN | 101099109 A | 1/2008 |
| CN | 101311774 A | 11/2008 |
| CN | 101868979 A | 10/2010 |
| CN | 102763026 A | 10/2012 |
| CN | 102809848 A | 12/2012 |
| CN | 103080978 A | 5/2013 |
| CN | 203573064 U | 4/2014 |
| CN | 104345468 A | 2/2015 |
| CN | 105021282 A | 11/2015 |
| CN | 106855675 A | 6/2017 |
| CN | 106873197 A | 6/2017 |
| CN | 106950776 A | 7/2017 |
| CN | 109286704 A | 1/2019 |
| CN | 110392186 A | 10/2019 |
| CN | 110708453 A | 1/2020 |
| CN | 111198445 A | 5/2020 |
| JP | S57158619 A | 9/1982 |
| JP | 63-19625 A | 1/1988 |
| JP | 2005173493 A | 6/2005 |
| JP | 2017021097 A | 1/2017 |
| KR | 20190015911 A | 2/2019 |

OTHER PUBLICATIONS

Daniel A. Lavigne, M Ianie Breton, Georges Fournier, Jean-François Charette, Mario Pichette, Vincent Rivet, Anne-Pier Bernier, "Target discrimination of man-made objects using passive polarimetric signatures acquired in the visible and infrared spectral bands," Proc. SPIE 8160, Polarization Science and Remote Sensing V, 816007 (Sep. 9, 2011); https://doi.org/10.1117/12.894055.

Jason Mudge, Miguel Virgen, "Near-infrared simultaneous Stokes imaging polarimeter: integration, field acquisitions, and instrument error estimation," Proc. SPIE 8160, Polarization Science and Remote Sensing V, 81600B (Sep. 9, 2011); https://doi.org/10.1117/12.892645.

J. Scott Tyo, Dennis L. Goldstein, David B. Chenault, and Joseph A. Shaw, "Review of passive imaging polarimetry for remote sensing applications," Appl. Opt. 45, 5453-5469 (2006).

Lawrence B. Wolff et al, Polarization camera for computervision with a beam splitter, vol. 11, No. 11/Nov. 1994/J. Opt. Soc. Am. A 2935, 11 pages.

Tucid, Polarization—A property of light, http://thinklucid.cn/tech-briefs/polarization-explained-sony-polarized-sensor/, 2022, 8 pages.

Knight, OnePlus Concept One concept electrochromic glass revealed, https://www.ithome.com/0/467/394.htm, Jan. 8, 2020, 2 pages.

International Search Report and Written Opinion issued in PCT/CN2021/103014, dated Oct. 11, 2021, 13 pages.

Office Action issued in CN202010818917.8, dated Jul. 12, 2022, 6 pages.

Extended European Search Report issued in EP Application No. 21855264.4 dated Nov. 6, 2023.

* cited by examiner

POLARIZER AND ARRAY, POLARIZATION-CONTROLLABLE METHOD AND APPARATUS, AND ELECTRONIC DEVICE CONTROLLING A STATE OF CONNECTIVITY

CROSS-REFERENCE TO RELATED APPLICATIONS

This application is a continuation of International Application No. PCT/CN2021/103014, filed on Jun. 29, 2021, which claims priority to Chinese Patent Application No. 202010818917.8, filed on Aug. 14, 2020. The disclosures of the aforementioned applications are hereby incorporated by reference in their entireties.

TECHNICAL FIELD

This application relates to the field of polarizer technologies, and in particular, to a polarizer and an array, a polarization-controllable method and apparatus, and an electronic device.

BACKGROUND

A polarization characteristic of light is an attribute determined by a transverse wave characteristic of the light. When the light illuminates an object surface, reflection, refraction, and diffraction occur. When the light is reflected, the polarization characteristic of the light changes. For example, polarized light is generated after natural light is reflected by an object surface. This change is related to a physical and chemical characteristic of a target, and the polarized light may reflect the polarization characteristic of the target. Polarized light is extensively used, for example, in photography, 3D movies, target detection, and target measurement.

Refer to FIG. 1 for a current method for generating polarized light. A linear polarizer is placed on each pixel of a camera detector, polarization directions of adjacent pixels are different, polarizers one-to-one correspond to pixels, a polarizer array is embedded between a pixel array and a micro lens array, and then polarized light in different directions is collected by using a polarization detector.

In this technology, polarizers need to one-to-one correspond to pixels, and are embedded between a pixel array and a micro lens array, causing loss of image resolution. In addition, a polarization detector needs to be specially customized to collect polarized light in different directions, and production costs are high.

SUMMARY

Embodiments of this application provide a polarizer, a polarizer array, a polarization-controllable method and apparatus, and an electronic device.

According to a first aspect, an embodiment of this application provides a polarizer. The polarizer includes multiple types of polarization units arranged in a same plane, and each type of the multiple types of polarization units includes a first liquid crystal cell and a second liquid crystal cell that are laminated. For example, incident light may first pass through a liquid crystal cell (for example, the first liquid crystal cell) and then pass through another liquid crystal cell (for example, the second liquid crystal cell). The first liquid crystal cell includes a first liquid crystal layer and a first alignment film, the first alignment film is configured to align the first liquid crystal layer, and the first alignment film is connected to a first electrode layer configured to apply an external voltage to the first liquid crystal layer. The second liquid crystal cell includes a second liquid crystal layer and a second alignment film, the second alignment film is configured to align the second liquid crystal layer, and the second alignment film is connected to a second electrode layer configured to apply an external voltage to the second liquid crystal layer. Both the first liquid crystal layer and the second liquid crystal layer include a dye molecule configured to absorb a light wave. An orientation of the first alignment film and an orientation of the second alignment film form an inter-plane angle, where the inter-plane angle is used to: when no external voltage is applied to the first liquid crystal cell and the second liquid crystal cell, make a transmittance of incident light less than a first threshold after the incident light passes through the first liquid crystal cell and the second liquid crystal cell; and orientations of first alignment films between all the multiple types of polarization units are different.

In this example, the first liquid crystal cell and the second liquid crystal cell in each polarization unit may be separately controlled as "connected" or "disconnected". When an external voltage (on state) is applied to the first liquid crystal cell or the second liquid crystal cell in each polarization unit, emergent light of each polarization unit is polarized light in one polarization direction. The polarizer includes multiple types of polarization units, and orientations of first alignment films between all the types of polarization units are different. Therefore, emergent light of the polarizer may be polarized light in multiple polarization directions. The polarized light carries polarization information, and the polarization information is used for polarization imaging. The polarizer in this example is extensively used in a wide range of application scenarios, and may be used in an optical lens of various electronic devices. The polarizer is directly disposed in front of the optical lens, and polarized light is generated by using the polarizer. Resolution of the optical lens is not affected, and production costs are low.

In addition, no external voltage being applied to first liquid crystal cells and second liquid crystal cells in all the types of polarization units in the polarizer may further implements a function of light attenuation. To be specific, an orientation of a first alignment film and an orientation of a second alignment film in a same type of polarization unit are almost perpendicular, and dye molecules in both the first liquid crystal layer and the second liquid crystal layer are in a high absorption state, so that a light transmittance of the polarizer is less than the first threshold, and the polarizer barely transmits light, implementing a function of light shielding. When an external voltage is applied to both the first liquid crystal cell and the second liquid crystal cell in each polarization unit of the polarizer, the light transmittance of the polarizer is greater than a second threshold, and the polarizer implements a function of light transmission. In this application, the polarizer can obtain polarized light in different directions, and can implement a function of light attenuation. Different functions may be integrated into one component, so that costs can be greatly reduced, and application scenarios are extensive.

In an optional implementation, a range of a light absorption band of the dye molecule is [250 nm, 1200 nm]. In this example, the dye molecule absorbs infrared light and visible light, so that when no external voltage is applied to the first liquid crystal cell and the second liquid crystal cell, light energy of emergent light is almost 0 after the incident light passes through the first liquid crystal cell and the second liquid crystal cell, and the polarizer works well in light shielding.

In an optional implementation, a value range of the inter-plane angle is [70°, 90°]. In this example, the inter-plane angle is close to 90°, and the orientation of the first alignment film is almost orthogonal to the orientation of the second alignment film. When no external voltage is applied to the first liquid crystal cell and the second liquid crystal cell, a transmittance of incident light is less than the first threshold after the incident light passes through the first liquid crystal cell and the second liquid crystal cell, and the polarizer works well in light shielding.

In an optional implementation, the multiple types of polarization units include a first polarization unit and a second polarization unit. An orientation of a first alignment film in the first polarization unit and an orientation of a first alignment film in the second polarization unit are at a first angle, and the first angle is 90 degrees. In this example, the polarizer includes two types of polarization units. When the first polarization unit and the second polarization unit are in a half-on state (for two liquid crystal cells in one polarization unit, an external voltage is applied to one liquid crystal cell, and no external voltage is applied to the other liquid crystal cell), one type of polarization unit is configured to obtain polarized light in one polarization direction. The polarizer includes two types of polarization units, that is, polarized light in two polarization directions may be obtained. This simplifies the orientation of the alignment film in the polarization unit of the polarizer array (first alignment films with only two orientations are disposed in the polarizer array). Uniformity in liquid crystal distribution directions in a power-off state (a state with no voltage being applied) is improved, so that an effect of polarization imaging using polarized light in the two orthogonal directions is better.

In an optional implementation, the multiple types of polarization units include a first polarization unit, a second polarization unit, and a third polarization unit. An orientation of a first alignment film in the first polarization unit and an orientation of a first alignment film in the second polarization unit are at a first angle, the orientation of the first alignment film in the second polarization unit and an orientation of a first alignment film in the third polarization unit are at a second angle, and both the first angle and the second angle are angles in a clockwise direction or angles in an anticlockwise direction. In this example, the polarizer includes three types of polarization units. When the first polarization unit, the second polarization unit, and the third polarization unit are all in a half-on state (for two liquid crystal cells in one polarization unit, an external voltage is applied to one liquid crystal cell, and no external voltage is applied to the other liquid crystal cell), one polarization unit is configured to obtain polarized light in one polarization direction, that is, polarized light in three polarization directions may be obtained. The polarizer array includes three types of polarization units, and polarized light in three polarization directions may be obtained by using the polarizer array. Because polarized light in three directions is obtained, application scenarios are relatively increased when polarization imaging is performed by using the polarized light.

In an optional implementation, a value range of both the first angle and the second angle is [30°, 80°]. In this example, when the polarizer includes three types of polarization units, polarized light in three polarization directions may be obtained, and the polarized light in the three polarization directions may be used for polarization imaging. When the value range of both the first angle and the second angle is [30°, 80°], the three polarization directions are spaced at an appropriate angle. For example, the three polarization directions are respectively 0°, 60°, and 120°. Polarization information in different polarization directions may be obtained, and the polarization information in the three polarization directions can be used in more polarization imaging scenarios.

In an optional implementation, the multiple types of polarization units include a first polarization unit, a second polarization unit, a third polarization unit, and a fourth polarization unit. An orientation of a first alignment film in the first polarization unit and an orientation of a first alignment film in the second polarization unit are at a first angle, the orientation of the first alignment film in the second polarization unit and an orientation of a first alignment film in the third polarization unit are at a second angle, the orientation of the first alignment film in the third polarization unit and an orientation of a first alignment film in the fourth polarization unit are at a third angle, and the first angle, the second angle, and the third angle are all angles in a clockwise direction or angles in an anticlockwise direction. In this example, the polarizer array includes four types of polarization units. Polarized light in four polarization directions may be obtained by using the polarizer array, and polarization imaging is extensively applied to a wide range of scenarios.

In an optional implementation, a value range of all the first angle, the second angle, and the third angle is [30°, 60°]. In this example, when the polarizer includes three types of polarization units, polarized light in three polarization directions may be obtained, and the polarized light in the three polarization directions may be used for polarization imaging. When the value range of both the first angle and the second angle is [30°, 60°], for example, four polarization directions are respectively 0°, 45°, 90°, and 120°, the four polarization directions are spaced at an appropriate angle. Polarization information in different polarization directions may be obtained, and the polarization information in the four polarization directions can be used in more polarization imaging scenarios.

In an optional implementation, when a quantity of the polarization units is greater than or equal to 3, a ¼-wave plate is disposed on a first surface of any type of the multiple types of polarization units, light is incident on a second surface of the polarization unit, and the first surface and the second surface are opposite surfaces. In this example, a quarter-wave plate may be added and a circular polarization state of emergent light passing through the polarizer is added, increasing an application scenario of polarization imaging.

According to a second aspect, an embodiment of this application provides a polarizer array, including multiple polarizers arranged in a same plane according to any one of the first aspect.

According to a third aspect, an embodiment of this application provides a polarization-controllable method, applied to a polarization-controllable apparatus. For example, the apparatus may be an electronic device such as a mobile phone, a notebook computer, or a tablet computer. The apparatus includes an optical lens, a power supply, and the polarizer array in the second aspect. An electrode layer of a first liquid crystal cell and an electrode layer of a second liquid crystal cell in each polarization unit of the polarizer array are connected to the power supply by using a switch, and the polarizer array and the optical lens are sequentially disposed along a light incidence direction. The method includes: The apparatus controls a state of the polarizer array by controlling a state of connectivity between the power supply and an electrode layer of a first liquid crystal cell and a state of connectivity between the power supply and an electrode layer of a second liquid crystal cell in each polarization unit. The state of the polarizer array includes a first state, and when the polarizer array is in the first state, the polarizer array is configured to polarize light that is incident to the optical lens, to obtain polarized light in different directions. In this embodiment, the polarizer array is disposed in front of the optical lens (in the light incidence direction). Different states of the polarizer array are controlled, so that the polarizer array can switch between different states such as light shielding, light transmission, and polarized light acquisition, and a response speed is fast. In addition, the polarization unit in the polarizer uses a structure of laminated liquid crystal cells. Performance is stable, a service life is long, and costs are low.

In an optional implementation, controlling a state of the polarizer array by controlling a state of connectivity between the power supply and an electrode layer of a first liquid crystal cell and a state of connectivity between the power supply and an electrode layer of a second liquid crystal cell in each polarizer unit includes: When a polarization imaging function is enabled, multiple types of polarization units in the polarizer array are controlled to be in a half-on state, so that the polarizer array is in the first state. Emergent light of one type of polarization unit is polarized light in one direction, and the multiple types of polarization units are configured to obtain polarized light in multiple polarization directions. In this example, a state of the polarizer array is controlled by separately driving the first liquid crystal cell and the second liquid crystal cell in each polarization unit to be in a "connected" or "disconnected" state. When one liquid crystal cell in each type of polarization unit is in an on state, and the other liquid crystal cell is in an off state, the polarizer array is configured to obtain polarized light in multiple polarization directions. The polarized light carries polarization information, and the polarization information is used for polarization imaging. Application scenarios are extensive, and production costs are low.

In an optional implementation, the method may further include: receiving a first operation input by a user, where the first operation triggers the polarization-controllable apparatus to enable the polarization imaging function. In this example, the polarization imaging function is enabled by using a user operation, to control the polarizer array to be in the first state. The apparatus controls a state of the polarizer array by receiving the first operation of the user, providing a triggering manner for controlling the state of the polarizer array, so that the state of the polarizer array can be controlled according to a user requirement.

In an optional implementation, the method may further include: The apparatus collects a preview image, extracts an image feature of the preview image, and then enables the polarization imaging function based on the image feature. In this example, the apparatus may automatically control a state of the polarizer array based on the image feature of the preview image. For example, if a contour feature of an object in a current preview image is blurred, the apparatus determines that defogging processing needs to be performed, and the apparatus automatically enables the polarization imaging function without user participation. This reduces operation steps of the user and improves user experience.

In an optional implementation, the method may further include: when the polarizer array is in the first state, collecting image information of a target object in multiple polarization directions; and generating a polarized image based on the image information in the multiple polarization directions. In this example, when the polarizer array is in the first state, the apparatus may perform polarization imaging of different effects by selecting different algorithms based on different application scenarios by using obtained polarization images in multiple polarization directions. Application scenarios are extensive.

In an optional implementation, controlling a state of the polarizer array by controlling a state of connectivity between the power supply and an electrode layer of a first liquid crystal cell and a state of connectivity between the power supply and an electrode layer of a second liquid crystal cell in each polarizer unit may include: controlling the electrode layer of the first liquid crystal cell and the electrode layer of the second liquid crystal cell of each polarization unit to be disconnected from the power supply, so that the polarizer array is in a second state. When the polarizer array is in the second state, a light transmittance of the polarizer array is less than a first threshold, and the polarizer array implements a light shielding effect. In this example, the apparatus implements different functions of the polarizer array by controlling a state of the polarizer array. For example, when the polarizer array is in the second state, the polarizer array has a function of light attenuation. The function may be applied to different application scenarios, for example, a function of hidden camera, so that one component implements a function of obtaining polarized light in different polarization directions and a function of light attenuation. Functions are integrated in one component, greatly reducing costs.

In an optional implementation, controlling a state of the polarizer array by controlling a state of connectivity between an electrode layer of a first liquid crystal cell and the power supply and a state of connectivity between an electrode layer of a second liquid crystal cell and the power supply in each polarization unit may include: controlling the electrode layer of the first liquid crystal cell and the electrode layer of the second liquid crystal cell of each polarization unit to be connected to the power supply, so that the polarizer array is in a third state. When the polarizer array is in the third state, a light transmittance of the polarizer array is greater than a second threshold, and the polarizer array implements a light transmission effect. In this example, the apparatus implements different functions of the polarizer array by controlling a state of the polarizer array. For example, when the polarizer array is in the third state, the polarizer array implements a light transmission effect. The function may be applied to different application scenarios. For example, switching from a light shielding state to a light transmission state may implement switching from a hidden camera to an exposed camera, so that switching between different effects is implemented on one component. Application scenarios are extensive, and functions are integrated in one component, greatly reducing costs.

In an optional implementation, the electronic device includes a camera, the camera includes an optical lens, and the method further includes:

The apparatus receives a second operation input by the user, where the second operation triggers use of the camera; and then controls, based on the second operation, the polarizer array to be in the third state. In this example, a state of the polarizer array may be controlled based on an operation of the user, and a state of the polarizer array may be controlled according to a requirement of the user.

In an optional implementation, controlling a state of the polarizer array by controlling a state of connectivity between an electrode layer of a first liquid crystal cell and the power supply and a state of connectivity between an electrode layer of a second liquid crystal cell and the power supply may include: controlling electrode layers of first liquid crystal cells and second liquid crystal cells of all polarization units in a first region in the polarizer array to be connected to the power supply, and controlling electrode layers of first liquid crystal cells and second liquid crystal cells of all polarization units in a second region in the polarizer array to be disconnected from the power supply, so that the polarizer array is in a fourth state. When the polarizer array is the fourth state, a light transmittance of the second region is less than the first threshold, and a light transmittance of the first region is greater than the second threshold. In this example, a light shielding region and a light transmission region of the polarizer array may be controlled based on regions. The polarizer array is equivalent to a coded-aperture mask, and may be used for coded-aperture imaging. Compared with a conventional coded-aperture mask, the polarizer array in this example may control light shielding and light transmission states in different regions by controlling states of voltage applying on the first liquid crystal cell and the second liquid crystal cell in each polarization unit. A light shielding region and a light transmission region can be flexibly controlled based on a required scenario.

According to a fourth aspect, an embodiment of this application provides a polarization control apparatus. The polarization control apparatus includes an optical lens, a power supply, and the polarizer array in the second aspect. An electrode layer of a first liquid crystal cell and an electrode layer of a second liquid crystal cell in each polarization unit of the polarizer array are connected to the power supply by using a switch, and the polarizer array and the optical lens are sequentially disposed along a light incidence direction. The polarization control apparatus further includes a control module, where the control module is configured to control a state of the polarizer array by controlling a state of connectivity between an electrode layer of a first liquid crystal cell and the power supply and a state of connectivity between an electrode layer of a second liquid crystal cell and the power supply in each polarization unit. The state includes a first state, and when the polarizer array is in the first state, the polarizer array is configured to polarize light that is incident to the optical lens, to obtain polarized light in different directions. In this embodiment, the polarizer array is disposed in front of the optical lens (in the light incidence direction). Different states of the polarizer array are controlled, so that the polarizer array can switch between different states such as light shielding, light transmission, and polarized light acquisition, and a response speed is fast. In addition, the polarization unit in the polarizer uses a structure of laminated liquid crystal cells. Performance is stable, a service life is long, and costs are low.

In an optional implementation, the control module is further configured to control multiple types of polarization units in the polarizer array to be in a half-on state, so that the polarizer array is in the first state. Emergent light of one polarization unit is polarized light in one direction, and multiple types of polarization units are configured to obtain polarized light in multiple polarization directions. In this example, a state of the polarizer array is controlled by separately driving the first liquid crystal cell and the second liquid crystal cell in each polarization unit to be in a "connected" or "disconnected" state. When one liquid crystal cell in each type of polarization unit is in an on state, and the other liquid crystal cell is in an off state, the polarizer array is configured to obtain polarized light in multiple polarization directions. The polarized light carries polarization information, and the polarization information is used for polarization imaging. Application scenarios are extensive, and production costs are low.

In an optional implementation, the polarization control apparatus further includes a receiving module, where the receiving module is configured to receive a first operation input by a user, and the first operation triggers the polarization control apparatus to enable a polarization imaging function. In this example, the polarization imaging function is enabled by using a user operation, to control the polarizer array to be in the first state. The apparatus controls a state of the polarizer array by receiving the first operation of the user, providing a triggering manner for controlling the state of the polarizer array, so that the state of the polarizer array can be controlled according to a user requirement.

In an optional implementation, the polarization control apparatus further includes an image collection module and a processing module. The image collection module is configured to collect a preview image. The processing module is configured to extract an image feature of the preview image collected by the image collection module; and enable the polarization imaging function based on the image feature. In this example, the apparatus may automatically control a state of the polarizer array based on the image feature of the preview image. For example, if a contour feature of an object in a current preview image is blurred, the apparatus determines that defogging processing needs to be performed, and the apparatus automatically enables the polarization imaging function without user participation. This reduces operation steps of the user and improves user experience.

In an optional implementation manner, the polarization control apparatus further includes an image collection module and a processing module.

The image collection module is further configured to: when the polarizer array is in the first state, collect image information of a target object in multiple polarization directions. The processing module is further configured to generate a polarized image based on the image information that is in the multiple polarization directions and that is collected by the image collection module. In this example, when the polarizer array is in the first state, the apparatus may perform polarization imaging of different effects by selecting different algorithms based on different application scenarios by using obtained polarization images in multiple polarization directions. Application scenarios are extensive.

In an optional implementation, the control module is further configured to control an electrode layer of a first liquid crystal cell and an electrode layer of a second liquid crystal cell of each type of polarization unit to be disconnected from the power supply, so that the polarizer array is in a second state. When the polarizer array is in the second state, a light transmittance of the polarizer array is less than a first threshold, and the polarizer array implements a light shielding effect. In this example, the apparatus implements different functions of the polarizer array by controlling a state of the polarizer array. For example, when the polarizer array is controlled to be in the second state, the polarizer array has a function of light attenuation. The function may be applied to different application scenarios, for example, a function of hidden camera, so that one component implements a function of obtaining polarized light in different polarization directions and a function of light attenuation. Functions are integrated in one component, greatly reducing costs.

In an optional implementation, the control module is further configured to control an electrode layer of a first liquid crystal cell and an electrode layer of a second liquid crystal cell of each type of polarization unit to be connected to the power supply, so that the polarizer array is in a third state. When the polarizer array is in the third state, a light transmittance of the polarizer array is greater than a second threshold, and the polarizer array implements a light shielding effect. In this example, the apparatus implements different functions of the polarizer array by controlling a state of the polarizer array. For example, when the polarizer array is in the third state, the polarizer array implements a light transmission effect. The function may be applied to different application scenarios. For example, switching from a light shielding state to a light transmission state may implement switching from a hidden camera to an exposed camera, so that switching between different effects is implemented on one component. Application scenarios are extensive, and functions are integrated in one component, greatly reducing costs.

In an optional implementation, the polarization control apparatus includes a camera, the camera includes an optical lens, and the polarization control apparatus further includes a receiving module. The receiving module is configured to receive a second operation input by the user, where the second operation triggers use of the camera. The control module is further configured to control, based on the second operation received by the receiving module, the polarizer array to be in the third state. In this example, a state of the polarizer array may be controlled based on an operation of the user, and a state of the polarizer array may be controlled according to a requirement of the user.

In an optional implementation, the control module is further configured to control electrode layers of first liquid crystal cells and second liquid crystal cells of all polarization units in a first region in the polarizer array to be connected to the power supply, and control electrode layers of first liquid crystal cells and second liquid crystal cells of all polarization units in a second region in the polarizer array to be disconnected from the power supply, so that the polarizer array is in a fourth state. When the polarizer array is in the fourth state, a light transmittance of the second region is less than the first threshold, and a light transmittance of the first region is greater than the second threshold. In this example, a light shielding region and a light transmission region of the polarizer array may be controlled based on regions. The polarizer array is equivalent to a coded-aperture mask, and may be used for coded-aperture imaging. Compared with a conventional coded-aperture mask, the polarizer array in this example may control light shielding and light transmission states in different regions by controlling states of voltage applying on the first liquid crystal cell and the second liquid crystal cell in each polarization unit. A light shielding region and a light transmission region can be flexibly controlled based on a required scenario.

According to a fifth aspect, an embodiment of this application provides an electronic device, including a processor and the polarizer array in the second aspect that is connected to the processor. The processor is coupled to at least one memory, and the processor is configured to read a computer program stored in the at least one memory, to enable the electronic device to perform the method according to any implementation of the third aspect.

According to a sixth aspect, an embodiment of this application provides an electronic device, including a driver, a main control chip connected to the driver, and the polarizer array in the second aspect. The driver is configured to receive a control signal of the main control chip, and control a state of the polarizer array based on the control signal. The main control chip is configured to enable the electronic device to perform the method according to any implementation of the third aspect.

According to a seventh aspect, an embodiment of this application provides a computer-readable medium. The computer-readable storage medium is configured to store a computer program, and when the computer program is run on a computer, the computer is enabled to perform the method according to any implementation of the third aspect.

According to an eighth aspect, an embodiment of this application provides a chip, including a processor and a communication interface. The processor is configured to read an instruction to perform the method according to the third aspect.

DESCRIPTION OF EMBODIMENTS

Figure 1:
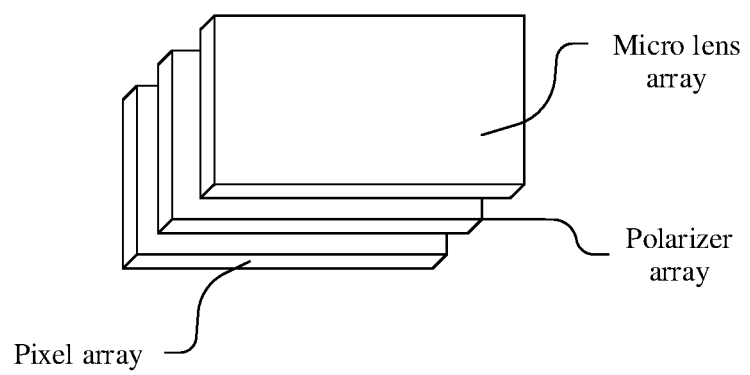
FIG. 1 is a schematic diagram depicting a structure of a polarization device.

The following clearly describes the technical solutions in embodiments of this application with reference to the accompanying drawings in embodiments of this application. It is clear that the described embodiments are merely some but not all of embodiments of this application. All other embodiments obtained by a person skilled in the art based on embodiments of this application without creative efforts shall fall within the protection scope of this application.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that embodiments described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device.

A polarizer with controllable polarization is provided, where the polarizer includes multiple types of polarization units arranged in a same plane. For example, the polarizer may include two, three, or four polarization units. Each polarization unit includes laminated liquid crystal cells, the laminated liquid crystal cells include a first liquid crystal cell and a second liquid crystal cell, and both the first liquid crystal cell and the second liquid crystal cell include a double-layer alignment film configured to align the liquid crystal layer. Each layer of the double-layer alignment film is connected to an electrode. In other words, each liquid crystal cell has an independent electrode, and electrodes of two liquid crystal cells of a same polarization unit may be independently controlled to be "on" or "off". An orientation of the alignment film of the first liquid crystal cell is almost perpendicular to an orientation of the alignment film of the second liquid crystal cell. Orientations of alignment films of first liquid crystal cells between all the multiple types of polarization units are different. In this embodiment, the first liquid crystal cell and the second liquid crystal cell in each polarization unit may be separately controlled to be "on" or "off". Polarized light in different directions may be obtained by using the polarizer. The polarized light carries polarization information, and the polarization information may be used for polarization imaging. The polarizer in this embodiment of this application is extensively used in a wide range of application scenarios, and may be used in an optical lens of various electronic devices. The polarizer is directly disposed in front of the optical lens, and polarized light is generated by using the polarizer. Resolution of the optical lens is not affected, and production costs are low.

For ease of understanding, the terms in this application are first described.

Polarization state: An electric field vector of a light wave depicts an ellipse in a process of periodic vibration. The ellipse represents the polarization state of the light wave. When phases of x and y components of the electric field vector are the same, the ellipse degenerates into a straight line segment, and this is referred to as linear polarization. When the phases of the x and y components differ by 90 degrees, the ellipse degenerates into a circle, and this is referred to as circular polarization. In this application, the polarized light obtained by using the polarizer may include linearly polarized light in different directions.

Nematic liquid crystal (nematie): A nematic liquid crystal is also referred to as an N-phase liquid crystal, which is formed by rod-shaped molecules with a large geometric length and width, and is arranged in a one-dimensional order into a layered structure, where the molecules keep almost parallel in a major axis direction of the molecule.

Smectic liquid crystal: Regularity of a smectic structure is most similar to a crystal phase. Rod-shaped molecules of such liquid crystals are arranged in parallel to form a layered structure. Molecular axes are perpendicular to the layer, and the rod-shaped molecules can move only in the layer.

Dichromatic dye: Dichroism means that light absorption by a substance depends on a polarization state of incident light The dichromatic dye has linear dichroism. When an electrical vector of a light wave is perpendicular to an optical axis of the dye, the light basically passes through. When the electrical vector of the light wave is parallel to the optical axis of the dye, the light is basically absorbed. This type of dye is referred to a positive dichromatic dye, or referred to as a negative dichromatic dye in an opposite case. The dye mentioned in embodiments of this application is a dichromatic dye. Whether the dichromatic dye is a positive dichromatic dye or a negative dichromatic dye is not limited. The dichromatic dye in embodiments may be described by using a positive dichromatic dye as an example.

Guest-host effect (guest-host, G-H): A dichromatic dye (referred to as a guest) is dissolved in a specific liquid crystal (referred to as a host). For example, a dichromatic dye is dissolved in a liquid crystal (such as a nematic liquid crystal or smectic liquid crystal). Generally, a major axis of a long dye molecule is arranged in parallel with a major axis of a liquid crystal molecule. When the liquid crystal molecule deflects under control of an electric field, the dye molecule also deflects. Because the major axis and the minor axis of the dichromatic dye molecule are anisotropic in light wave absorption, an amount of light absorbed by the dye can be controlled by using an electric field, to change a color of the guest-host liquid crystal. This electro-optic effect is referred to as the guest-host effect.

Alignment film: Two substrates are needed on two sides of a liquid crystal layer to fix the liquid crystal layer. To enable liquid crystal molecules to be arranged in order in a specific direction, a surface of the substrate that is in contact with the liquid crystal is coated with a layer of film material. A surface of the film material has multiple grooves in a predetermined direction, the multiple grooves are arranged in parallel, and the film material having the groove structure is an alignment film. The alignment film provides an interface condition for uniform arrangement of liquid crystal molecules, and the groove of the alignment film is used to arrange the liquid crystal in a predetermined direction. The predetermined direction is an orientation of the alignment film.

Inter-plane angle: The inter-plane angle is an angle formed by straight lines on different planes. In this application, in a same polarization unit, an orientation of a first alignment film in a first liquid crystal cell and an orientation of a second alignment film in a second liquid crystal cell forming an inter-plane angle means that: The first liquid crystal cell and the second liquid crystal cell are laminated. Therefore, the first liquid crystal cell and the second liquid crystal cell are on different planes. The orientation of the first alignment film may be equivalent to a straight line, the orientation of the second alignment film may be equivalent to another straight line, and the inter-plane angle may be understood as an angle between the two straight lines on different planes.

An embodiment of this application provides a polarizer, and the polarizer includes multiple types of polarization units arranged in a same plane. For example, a quantity of the polarization units may be 2, 3, 4, or the like. This is not specifically limited. Structures of the multiple polarization units are the same, and polarization directions of the multiple polarization units are different.

Figure 2:
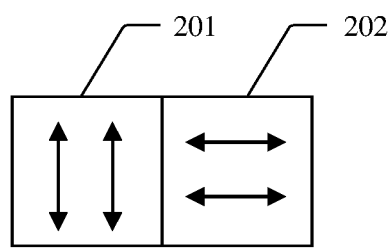
FIG. 2 is a schematic diagram of a polarizer including two polarization units according to an embodiment of this application.

Refer to FIG. 2 for an example. The polarizer may be described by using an example in which the polarizer includes two types of polarization units. The two types of polarization units include a first polarization unit 201 and a second polarization unit 202. Structures of the two polarization units are the same. The following first describes the structure of the polarization unit 201. The structure of the second polarization unit 202 is understood with reference to the structure of the first polarization unit 201.

Figure 3:
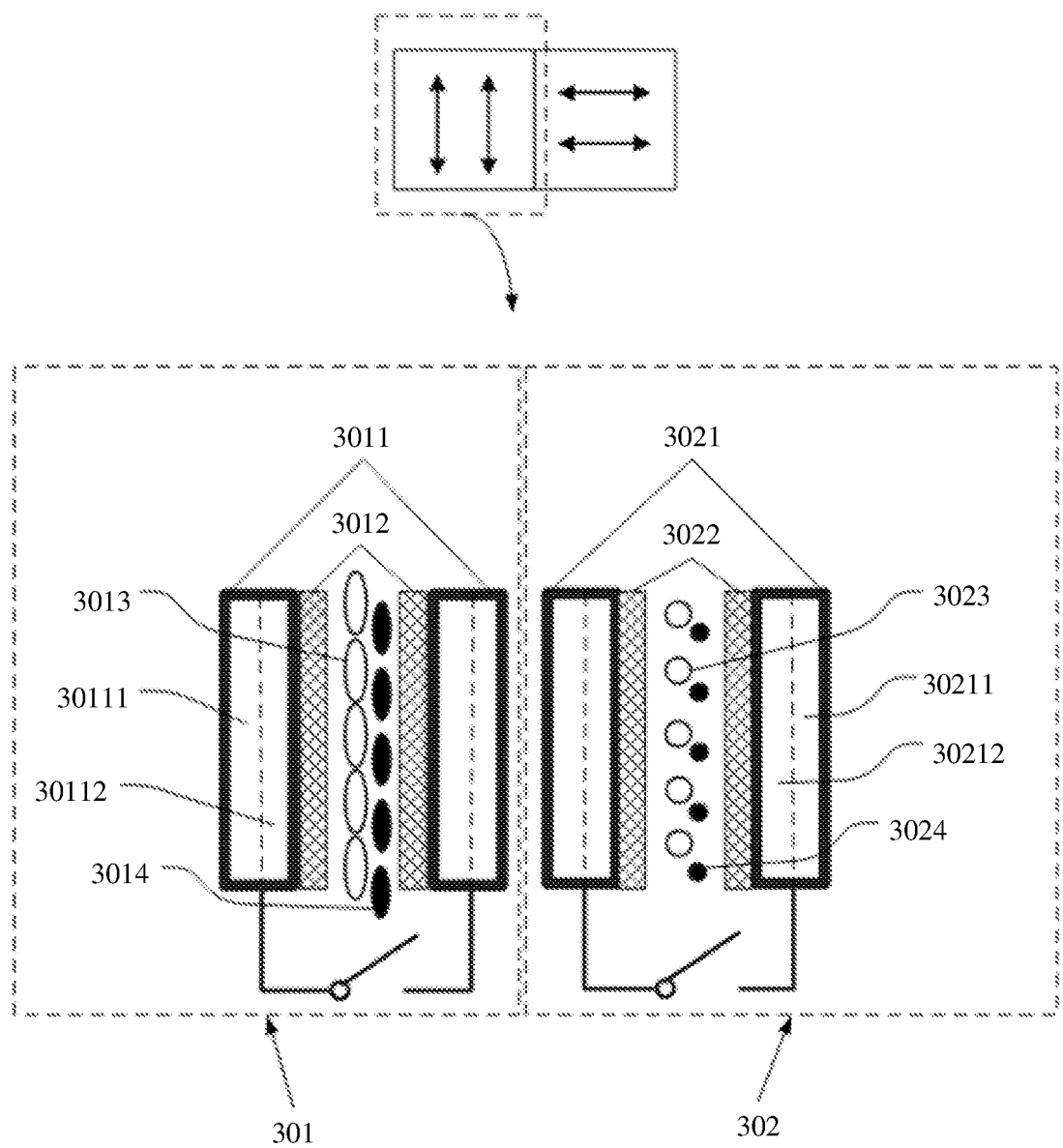
FIG. 3 is a schematic diagram depicting a structure of a polarization unit according to an embodiment of this application.

Refer to FIG. 3. The first polarization unit 201 includes a first liquid crystal cell 301 and a second liquid crystal cell 302 that are laminated. Each liquid crystal cell includes a substrate and an alignment film. The substrate is configured to fix the alignment film, and the alignment film is configured to align the liquid crystal layer. The substrate further includes a base and an electrode layer (the electrode layer may be a transparent electrode layer), and the electrode layer is disposed between the base and the alignment film. To distinguish between substrates and alignment films in two liquid crystal cells in a same polarization unit, a substrate in the first liquid crystal cell 301 is referred to as a first substrate 3011, and an alignment film in the first liquid crystal cell 301 is referred to as a first alignment film 3012. A substrate in the second liquid crystal cell 302 is referred to as a second substrate 3021, and an alignment film in the second liquid crystal cell 302 is referred to as a second alignment film 3022. Optionally, a side length of one polarization unit may be 0.1 mm to 10 mm.

The lamination in the foregoing means that the first liquid crystal cell 301 and the second liquid crystal cell 302 are on different planes, and the first liquid crystal cell 301 and the second liquid crystal cell 302 are disposed in parallel. There is space between the first liquid crystal cell 301 and the second liquid crystal cell 302. In a light incidence direction, the light may first pass through a liquid crystal cell (for example, the first liquid crystal cell 301), and then pass through another liquid crystal cell (for example, the second liquid crystal cell 302). The lamination may be "up and down" lamination, or may be "left and right" lamination, where "up and down" and "left and right" are relative concepts. Whether the two liquid crystal cells are laminated "up and down" or "left and right" may depend on a placement direction of the polarizer. The lamination in embodiments of this application may be referred to as "up and down" lamination, or may be referred to as "left and right" lamination. In this application, the following "double-layer" components may also be distinguished by "up and down", or by "left and right". For example, the first liquid crystal cell 301 is a left liquid crystal cell (or an upper liquid crystal cell), and the second liquid crystal cell is a right liquid crystal cell (or a lower liquid crystal cell). In this example, locations of the first liquid crystal cell and the second liquid crystal cell are not limited. For example, the first liquid crystal cell 301 is a left liquid crystal cell, and the second liquid crystal cell 302 is a right liquid crystal cell. Certainly, the first liquid crystal cell 301 may also be a right liquid crystal cell, and the second liquid crystal cell 302 may also be a left liquid crystal cell. In this embodiment of this application, an example in which the first liquid crystal cell 301 is a left liquid crystal cell, and the second liquid crystal cell 302 is a right liquid crystal cell is used for description.

Specifically, a structure of the first liquid crystal cell 301 is first described.

The first substrate 3011 is a double-layer substrate, and the first substrate 3011 includes a left substrate and a right substrate. The first alignment film 3012 is a double-layer alignment film, and the first alignment film 3012 includes a left alignment film and a right alignment film. The left substrate is coated with the left alignment film, the right substrate is coated with the right alignment film, and a first liquid crystal layer 3013 (for example, formed by nematic liquid crystal molecules or a smectic liquid crystal) is in the middle of the two alignment films (the left alignment film and the right alignment film). The first liquid crystal layer dissolves first dye molecules 3014 that are for light wave absorption, and an orientation of the left alignment film is parallel to an orientation of the right alignment film.

Further, the first substrate 3011 includes a first base 30111 and a first electrode layer 30112. The first alignment film 3012 is connected to the first electrode layer 30112 configured to apply an external voltage to the first liquid crystal layer 3013. Specifically, the left substrate includes a left base and a left transparent electrode layer, and the left transparent electrode layer (for example, a positive electrode) is disposed between the left base and the left 5 alignment film. A right transparent electrode layer (for example, a negative electrode) is disposed between a right base and the right alignment film, and the left transparent electrode layer and the right transparent electrode layer form the first electrode layer 30112. The base is a rigid or flexible glass or polymer.

The left transparent electrode layer and the right transparent electrode layer may be connected to a power supply by using a switch, so that an external electric field may be applied to the first liquid crystal layer 3013 in the middle of the two layers of alignment films, so that an arrangement status of the liquid crystal molecules changes. For example, a voltage is applied to the transparent electrode layer by using a driver, each liquid crystal cell may be independently driven, and two liquid crystal cells may also be synchronously driven.

The structure of the second liquid crystal cell 302 is the same as that of the first liquid crystal cell 301. For the structure of the second liquid crystal cell 302, refer to the structure of the first liquid crystal cell 301 for understanding. The second liquid crystal cell 302 includes a second substrate 3021 and a second alignment film 3022 configured to align the second liquid crystal layer. The second substrate 3021 includes a second base 30211 and a second electrode layer 30212. The second alignment film 3022 is connected to the second electrode layer 30212 configured to apply an external voltage to a second liquid crystal layer 3023. The second liquid crystal layer 3023 dissolves second dye molecules 3024 that are for light wave absorption. Dye molecules (the first dye molecule and the second dye molecule) show high absorption performance for electromagnetic waves of a specific band. Optionally, the absorption band of the dye molecule is in a range of 250 nm to 1200 nm. For the absorption band in the range of 250 nm to 1200 nm, the dye molecule is configured to absorb infrared light and visible light. Optionally, the absorption band is in a range of 380 nm to 780 nm, and the dye molecule is configured to absorb visible light. In this example, dye molecules of different absorption bands may be selected according to an actual application scenario.

The orientation of the first alignment film 3012 and the orientation of the second alignment film 3022 form an inter-plane angle. The inter-plane angle is used to: when no external voltage is applied to the first liquid crystal cell 301 and the second liquid crystal cell 302, make a transmittance of incident light less than a first threshold after the incident light passes through the first liquid crystal cell 301 and the second liquid crystal cell 302. The inter-plane angle is close to 90°. For example, a value range of the inter-plane angle may be [70°, 90°], and the inter-plane angle may be any value in [70°, 90°].

A structure of each type of the multiple types of polarization units is the same as the structure of the first polarization unit, and a difference between the multiple types of polarization units lies in that orientations of first alignment films (or second alignment films) between all the multiple types of polarization units are different. For example, as shown in FIG. 2, the orientation of the first alignment film in the first polarization unit is 0°, and the orientation of the first alignment film in the second polarization unit is 90°. In other words, the orientation of the second alignment film in the first polarization unit is 90°, and the orientation of the first alignment film in the second polarization unit is 0°.

It should be noted that, in embodiments of this application, the polarizer includes multiple types of polarization units, and "multiple types of" herein is different from "multiple". In an example of orientations of first alignment films of first liquid crystal cells in all types of polarization units, an orientation of a first alignment film in one "type" of polarization unit is one direction. For example, an orientation of a first alignment film (which may also be understood as a polarization direction) of one type of polarization unit is 0°, and an orientation of a first alignment film of another type of polarization unit is 90°. However, one type of polarization unit may include one or more polarization units, that is, may include one or more polarization units whose polarization direction is 0°, or may include polarization units whose polarization direction is 90°. For example, the polarizer includes two types of polarization units, for example, a polarization unit whose polarization direction is 0° and a polarization unit whose polarization direction is 90°. However, the polarizer may include four polarization units, including two polarization units whose polarization direction is 0°, and two polarization units whose polarization direction is 90°.

The following uses one polarization unit as an example to describe a state of the polarization unit when an external voltage is applied to the first liquid crystal cell and/or the second liquid crystal cell.

Figure 4:
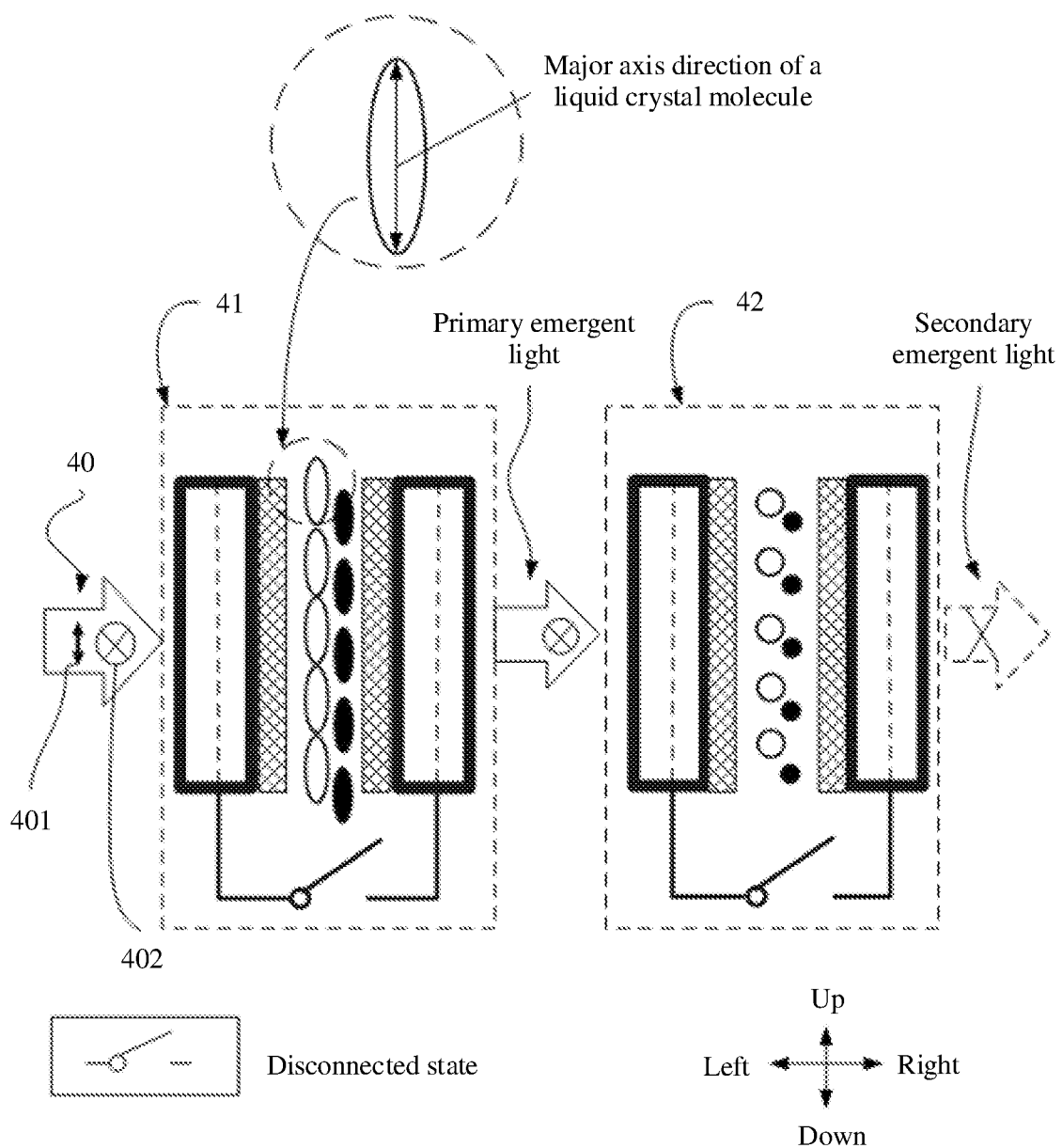
FIG. 4 is an example diagram of an off state of a polarization unit according to an embodiment of this application.

Refer to FIG. 4. An off state of a polarization unit is: No external voltage is applied to a first liquid crystal cell 41 and a second liquid crystal cell 42, that is, a transparent electrode layer of the first liquid crystal cell 41 is disconnected from a power supply, and a transparent electrode layer of the second liquid crystal cell 42 is disconnected from the power supply.

Liquid crystal molecules and dye molecules are ellipsoid-shaped. Therefore, both the liquid crystal molecule and the dye molecule have a major axis and a minor axis. An orientation of the liquid crystal molecule is a major axis direction of the liquid crystal molecule, and an orientation of the dye molecule is a major axis direction of the dye molecule.

When no external voltage is applied to the first liquid crystal cell 41, the major axis direction of the liquid crystal molecule in the first liquid crystal cell 41 is the same as an orientation of a first alignment film, that is, the major axis direction of the liquid crystal molecule in the first liquid crystal cell is parallel to the paper and in an up and down direction.

When no external voltage is applied to the second liquid crystal cell 42, the major axis direction of the liquid crystal molecule in the second liquid crystal cell 42 is the same as an orientation of a second alignment film, that is, the major axis direction of the liquid crystal molecule in the second liquid crystal cell is perpendicular to the paper.

Incident light 40 includes first-direction light 401 and second-direction light 402. The first-direction light 401 is light whose electrical vector vibration direction is parallel to the paper and that is in an up and down direction. The second-direction light 402 is light whose electrical vector vibration direction is perpendicular to the paper.

When the incident light 40 is incident to the first liquid crystal cell 41, the dye molecule is a dichromatic dye, and orientations of the liquid crystal molecule and the dye molecule are parallel to the electrical vector vibration direction of the first-direction light 401. Therefore, the first-direction light 401 is absorbed by the dye molecule in the first liquid crystal cell 41. The electrical vector vibration direction of the second-direction light 402 is perpendicular to the major axis direction of the dye molecule in the first liquid crystal cell 41. Therefore, the second-direction light 402 cannot be absorbed by the dye molecule, and the second-direction light 402 may directly pass through the first liquid crystal cell 41. Therefore, only the second-direction light remains in primary emergent light (emergent light passes through one liquid crystal cell), and the light in another direction (the first-direction light) has been absorbed by the dye of the first liquid crystal cell.

When the second-direction light 402 is incident to the second liquid crystal cell 42, the major axis direction of the liquid crystal molecule and the major axis direction of the dye molecule in the second liquid crystal cell 42 are parallel to the electrical vector vibration direction of the second-direction light 402, and the dye molecule in the second liquid crystal cell 42 absorbs the second-direction light 402. Finally, light energy of secondary emergent light (emergent light passes through two liquid crystal cells) is 0. In this case, a light transmittance of the polarization unit is less than a first threshold, and the polarization unit is in a light shielding state.

Figure 5:
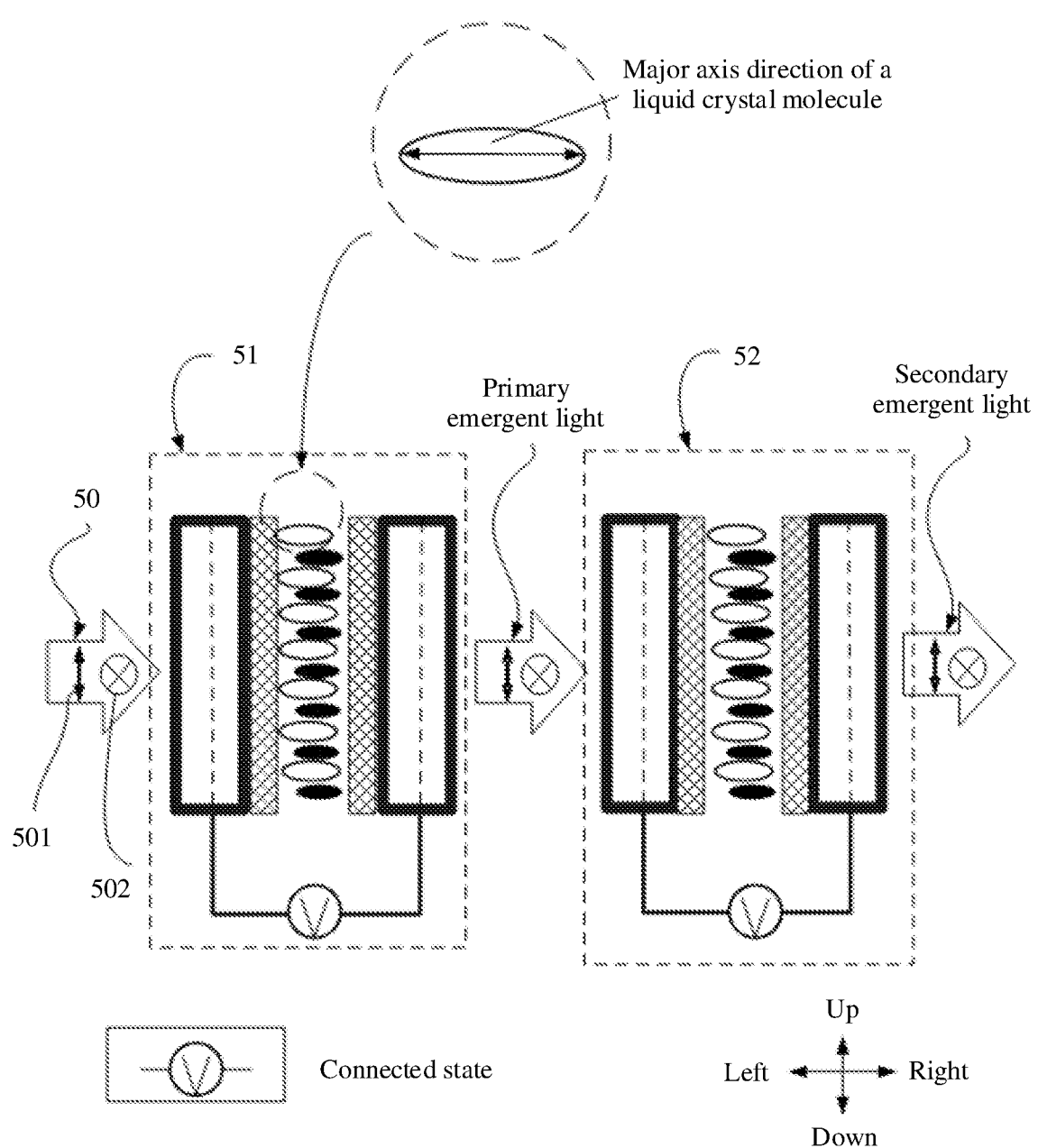
FIG. 5 is an example diagram of an on state of a polarization unit according to an embodiment of this application.

Refer to FIG. 5. An on state of a polarization unit is: An external voltage is applied to a first liquid crystal cell 51 and a second liquid crystal cell 52, that is, a transparent electrode layer of the first liquid crystal cell 51 is connected to a power supply, and a transparent electrode layer of the second liquid crystal cell 52 is connected to the power supply.

Driven by an electric field, arrangement of liquid crystal molecules is parallel to an electric field direction, and a major axis direction of the liquid crystal molecule is parallel to the electric field direction. Therefore, the major axis direction of the liquid crystal molecule in the first liquid crystal cell 51 deflects. Due to a guest-host effect of dye molecules and liquid crystal molecules, the dye molecule deflects with the liquid crystal molecule, and the major axis of the dye molecule always keeps parallel to the major axis of the liquid crystal molecule. Orientations of the liquid crystal molecule and dye molecule are parallel to the paper and perpendicular to the substrate, and orientations of liquid crystal molecules and dye molecules in the second liquid crystal cell 52 are also parallel to the paper and perpendicular to the substrate.

Incident light 50 includes first-direction light 501 and second-direction light 502. The first-direction light 501 is light whose electrical vector vibration direction is parallel to the paper and that is in an up and down direction. The second-direction light 502 is light whose electrical vector vibration direction is perpendicular to the paper.

When the incident light 50 is incident to the first liquid crystal cell 51, light in two vibration directions in the incident light 50 is perpendicular to the major axis of the dye molecule in the first liquid crystal cell 51. Therefore, the first-direction light 501 and the second-direction light 502 are not absorbed by the dye molecule, and directly pass through the first liquid crystal cell 51. That is, primary emergent light also includes the first-direction light 501 and the second-direction light 502.

When the primary emergent light is incident to the second liquid crystal cell 52, the first-direction light 501 and the second-direction light 502 are perpendicular to the major axis of the dye molecule in the second liquid crystal cell 52. Therefore, the first-direction light 501 and the second-direction light 502 are also not absorbed, and directly pass through the second liquid crystal cell 52. Secondary emergent light transmitted from the second liquid crystal cell 52 also includes light in two vibration directions (the first-direction light 501 and the second-direction light 502). In this case, a light transmittance of the polarization unit is greater than a second threshold, and the polarization unit is in the light transmission state.

Figure 6A:
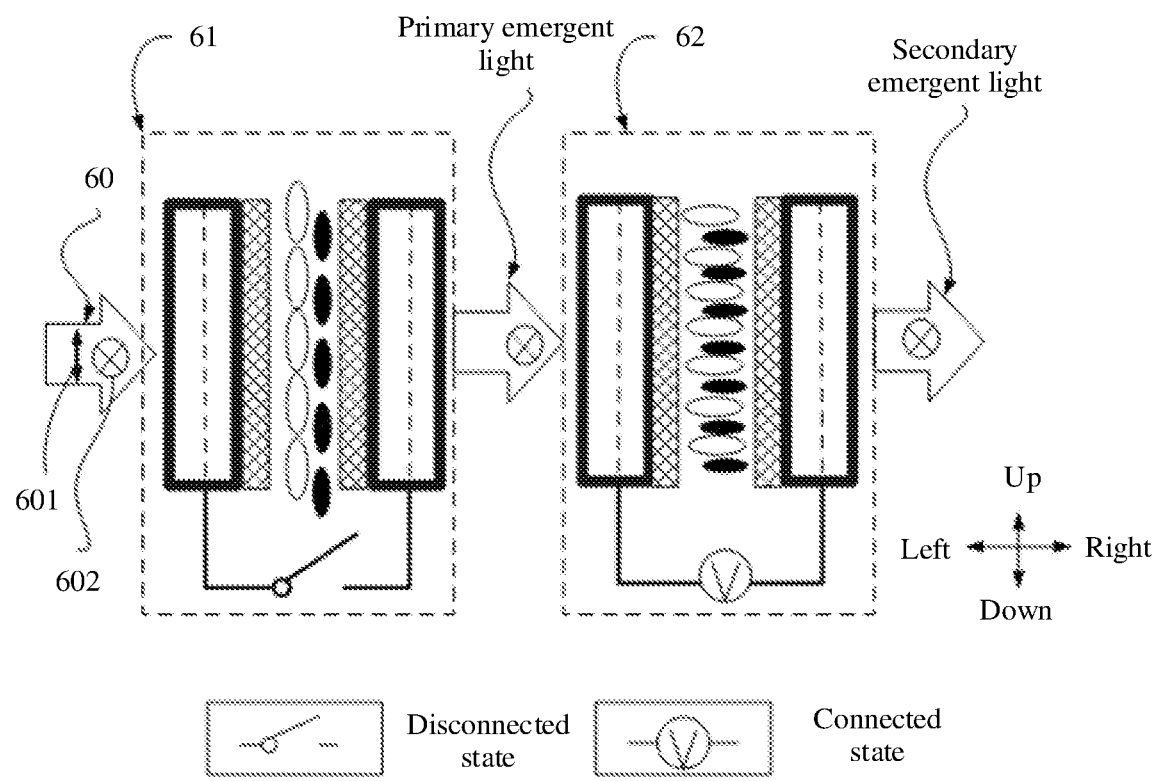
FIG. 6A and FIG. 6B are example diagrams of a half-on state of a polarization unit according to an embodiment of this application.
Figure 6B:
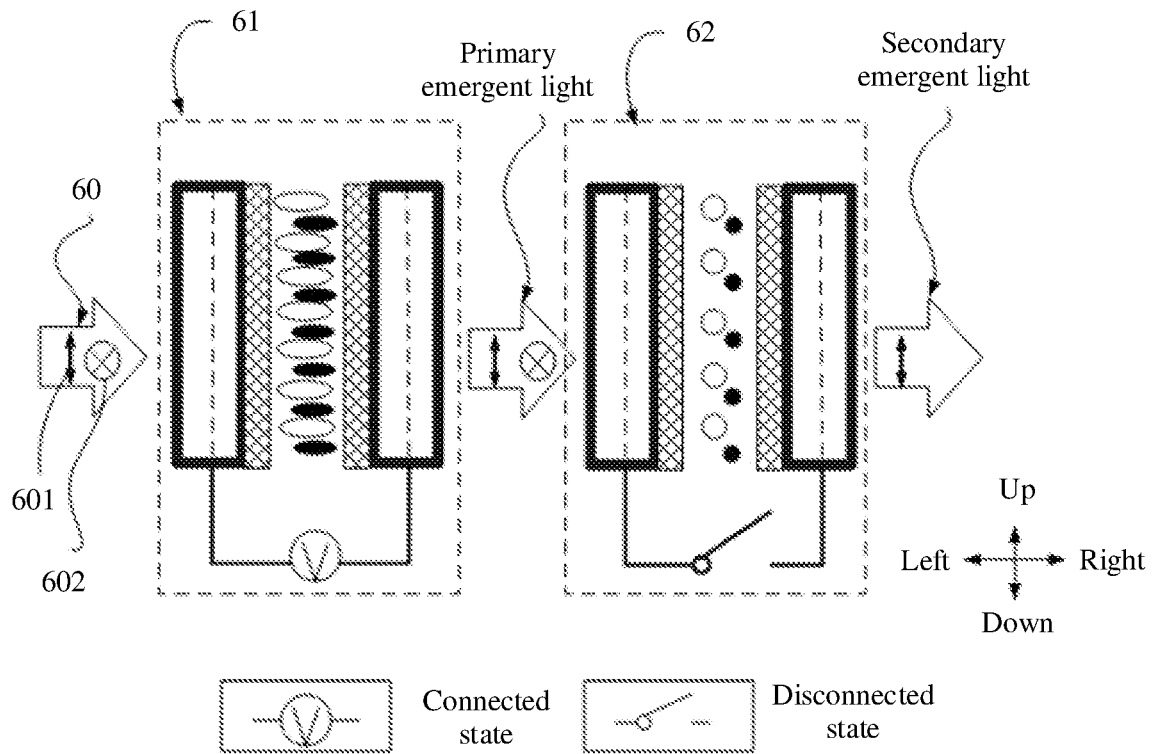

Refer to FIG. 6A and FIG. 6B. A half-on state of a polarization unit is: An external voltage is applied to a first liquid crystal cell or a second liquid crystal cell.

Refer to FIG. 6A for an example. No external voltage is applied to a first liquid crystal cell, and an external voltage is applied to a second liquid crystal cell.

When no external voltage is applied to the first liquid crystal cell 61, a major axis direction of a liquid crystal molecule in the first liquid crystal cell 61 is the same as an orientation of a first alignment film, that is, the major axis direction of the liquid crystal molecule in the first liquid crystal cell 61 is parallel to the paper and in an up and down direction.

Incident light 60 includes first-direction light 601 and second-direction light 602. The first-direction light 601 is light whose electrical vector vibration direction is parallel to the paper and that is in an up and down direction. The second-direction light 602 is light whose electrical vector vibration direction is perpendicular to the paper.

When the incident light 60 is incident to the first liquid crystal cell 61, the dye molecule is a dichromatic dye, and orientations of the liquid crystal molecule and the dye molecule are parallel to the electrical vector vibration direction of the first-direction light 601. Therefore, the first-direction light 601 is absorbed by the dye molecule in the first liquid crystal cell 61. Primary emergent light includes the second-direction light 602 that is not absorbed by the dye molecule.

When an external voltage is applied to the second liquid crystal cell 62, driven by an electric field, arrangement of liquid crystal molecules is parallel to an electric field direction, and a major axis direction of the liquid crystal molecule is parallel to the electric field direction. Therefore, the major axis direction of the liquid crystal molecule in the second liquid crystal cell 62 deflects. Due to a guest-host effect of dye molecules and liquid crystal molecules, the dye molecule deflects with the liquid crystal molecule, and the major axis of the dye molecule always keeps parallel to the major axis of the liquid crystal molecule. Orientations of liquid crystal molecules and dye molecules in the second liquid crystal cell 62 are also parallel to the paper and perpendicular to the substrate.

When primary emergent light is incident to the second liquid crystal cell 62, the second-direction light 602 is perpendicular to the major axis of the dye molecule in the second liquid crystal cell 62. Therefore, the second-direction light 602 is not absorbed by the dye molecule, and directly passes through the second liquid crystal cell 62. Secondary emergent light includes only the second-direction light 602. A polarization direction of the second-direction light 602 is the same as an orientation of a second alignment film in the second liquid crystal cell 62. For example, if the orientation of the second alignment film is 90°, the polarization direction of the secondary emergent light is 90°.

Refer to FIG. 6B for another example. An external voltage is applied to the first liquid crystal cell 61, and no external voltage is applied to the second liquid crystal cell 62.

When an external voltage is applied to the first liquid crystal cell 61, the major axis direction of the liquid crystal molecule in the first liquid crystal cell 61 deflects. Orientations of liquid crystal molecules and dye molecules in the first liquid crystal cell 61 are also parallel to the paper and perpendicular to the substrate.

When the incident light 60 is incident to the first liquid crystal cell 61, the first-direction light 601 and the second-direction light 602 are perpendicular to the major axis of the dye molecule in the first liquid crystal cell 61. Therefore, the first-direction light 601 and the second-direction light 602 are not absorbed by the dye molecule, and directly pass through the first liquid crystal cell 61. The primary emergent light includes the first-direction light 601 and the second-direction light 602.

When the primary emergent light is incident to the second liquid crystal cell 62, the second-direction light 602 is parallel to the major axis of the dye molecule in the second liquid crystal cell 62. Therefore, the second-direction light 602 is absorbed by the dye molecule. The first-direction light 601 is perpendicular to the major axis of the dye molecule in the second liquid crystal cell 62. Therefore, the first-direction light 601 is not absorbed by the dye molecule, and the first-direction light 601 may directly pass through the second liquid crystal cell 62. The secondary emergent light includes only the first-direction light 601. A polarization direction of the first-direction light 601 is the same as an orientation of a first alignment film in the first liquid crystal cell 61. For example, if the orientation of the first alignment film is 0°, the polarization direction of the secondary emergent light is 0°.

In this application, each type of polarization unit includes a first liquid crystal cell and a second liquid crystal cell that are laminated, and each liquid crystal cell may be independently driven, so that the polarization unit is in a different state (for example, an on state, an off state, or a half-on state). When a type of polarization unit is in a half-on state, polarized light in an orientation of a first alignment film (or a second alignment film) may be obtained. The polarizer includes multiple types of polarization units. Orientations of first alignment films between all the multiple types of polarization units are different. When the polarization unit is in a half-on state, polarized light in different directions may be obtained. Using FIG. 2 as an example, polarized light in two directions may be obtained, that is, polarized light in a direction of 0° and polarized light in a direction of 90°.

In addition, all the types of polarization units in the polarizer being in an off state may further implements a function of light attenuation. To be specific, an orientation of a first alignment film and an orientation of a second alignment film in a same polarization unit are almost perpendicular, and both a first liquid crystal layer and a second liquid crystal layer are in a high absorption state, so that a light transmittance is less than the first threshold, and the polarizer barely transmits light, implementing a function of light shielding. When all the types of polarization units of the polarizer are in an on state, the light transmittance of the polarizer is greater than the second threshold, and the polarizer implements a function of light transmission. In this application, the polarizer can obtain polarized light in different directions, and can implement a function of light attenuation. Different functions may be integrated into one component, so that costs can be greatly reduced, and application scenarios are extensive.

Figure 7:
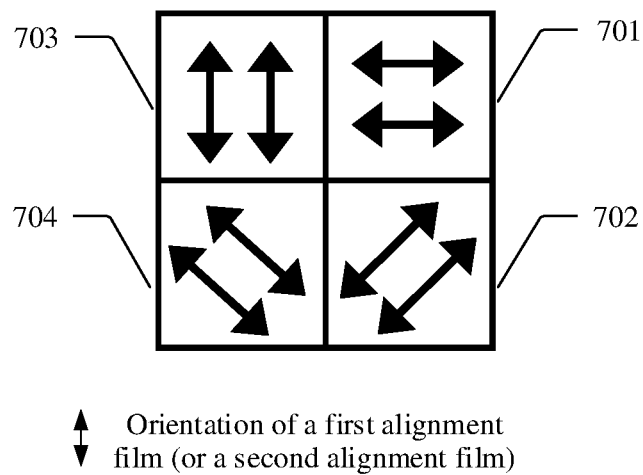
FIG. 7 is a schematic diagram of a polarizer including four types of polarization units according to an embodiment of this application.

Refer to FIG. 7. An example in which a polarizer includes four types of polarization units is used for description. The polarizer includes a first polarization unit 701, a second polarization unit 702, a third polarization unit 703, and a fourth polarization unit 704. An orientation of a first alignment film in the first polarization unit 701 and an orientation of a first alignment film in the second polarization unit 702 are at a first angle, the orientation of the first alignment film in the second polarization unit 702 and an orientation of a first alignment film in the third polarization unit 703 are at a second angle, and the orientation of the first alignment film in the third polarization unit 703 and an orientation of a first alignment film in the fourth polarization unit 704 are at a third angle. The first angle, the second angle, and the third angle are all angles in a clockwise direction or angles in an anticlockwise direction. Value ranges of the first angle and the second angle are both [30°, 60°], and values of the first angle and the second angle may be any value in [30°, 60°]. The first angle, the second angle, and the third angle may be the same, or may be different. This is not specifically limited. For ease of description, an example in which the first angle, the second angle, and the third angle are the same is used for description in this example. For example, the first angle, the second angle, and the third angle are all 30°. Alternatively, the first angle, the second angle, and the third angle are all 45°. Alternatively, the first angle, the second angle, and the third angle are all 55°, or the like. Only examples of the first angle, the second angle, and the third angle are made herein, which constitute no limitation.

For example, when the first angle, the second angle, and the third angle are all 30°, polarization directions of the four types of polarization units included in the polarizer may be: 0°, 30°, 60°, and 90°.

For another example, when the first angle, the second angle, and the third angle are all 45°, polarization directions of the four types of polarization units included in the polarizer may be 0°, 45°, 90°, and 135°.

For still another example, when the first angle, the second angle, and the third angle are all 55°, polarization directions of the four types of polarization units included in the polarizer may be: 0°, 55°, 110°, and 165°.

Figure 8:
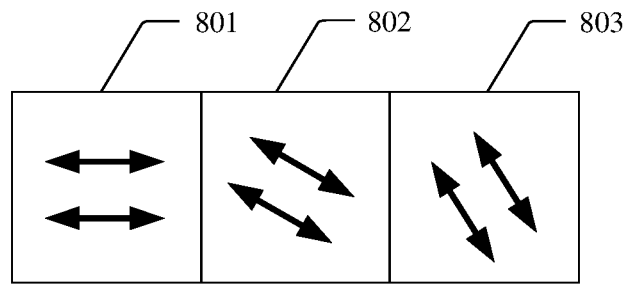
FIG. 8 is a schematic diagram of a polarizer including three types of polarization units according to an embodiment of this application.

Optionally, refer to FIG. 8. An example in which a polarizer includes three types of polarization units is used. The polarizer includes a first polarization unit 801, a second polarization unit 802, and a third polarization unit 803. An orientation of a first alignment film in the first polarization unit 801 and an orientation of a first alignment film in the second polarization unit 802 are at a first angle, the orientation of the first alignment film in the second polarization unit 802 and an orientation of a first alignment film in the third polarization unit 803 are at a second angle, and both the first angle and the second angle are angles in a clockwise direction or angles in an anticlockwise direction. Value ranges of the first angle and the second angle are both [30°, 80°], and values of the first angle and the second angle may be any value in [30°, 80°]. For ease of description, an example in which the first angle and the second angle are the same is used for description in this example. For example, both the first angle and the second angle are 40°. Alternatively, both the first angle and the second angle are 45°. Alternatively, both the first angle and the second angle are 60°, or the like.

For example, when the first angle and the second angle are 40°, polarization directions of the three types of polarization units included in the polarizer may be: 0°, 40°, and 80°.

For another example, when the first angle and the second angle are 45°, polarization directions of the three types of polarization units included in the polarizer may be 0°, 45°, and 90°.

For still another example, when the first angle and the second angle are 60°, polarization directions of the three types of polarization units included in the polarizer may be: 0°, 60°, and 120°.

Figure 9:
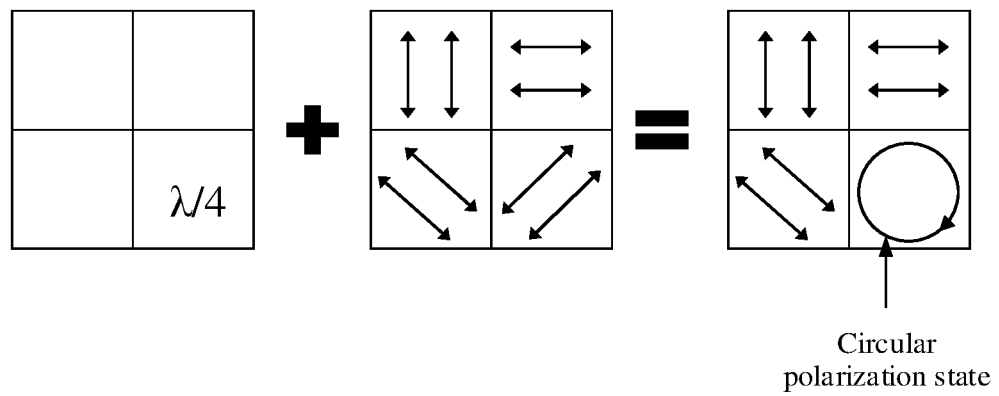
FIG. 9 is a schematic diagram of a linear polarization state and a circular polarization state according to an embodiment of this application.

Refer to FIG. 9. Optionally, when a quantity of polarization units is greater than or equal to 3, a quarter-wave plate for achromatic aberration is disposed on a first surface of any type of the multiple types of polarization units. In this example, four-quadrant polarization distribution is obtained by using an example in which the polarizer includes four types of polarization units. Light is incident on a second surface of the polarization unit, and the first surface and the second surface are opposite surfaces. Circularly polarized light can be further obtained by placing a quarter-wave plate on a first surface of one type of polarization unit. In this example, a quarter-wave plate may be added and a circular polarization state of emergent light passing through the polarizer is added, increasing an application scenario of polarization imaging.

Figure 10A:
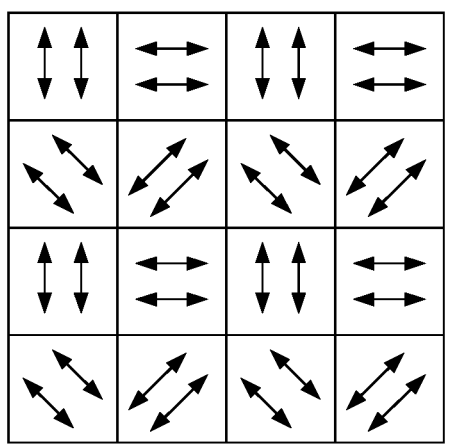
FIG. 10A is a schematic diagram of a polarizer array including four types of polarization units according to an embodiment of this application.
Figure 10B:
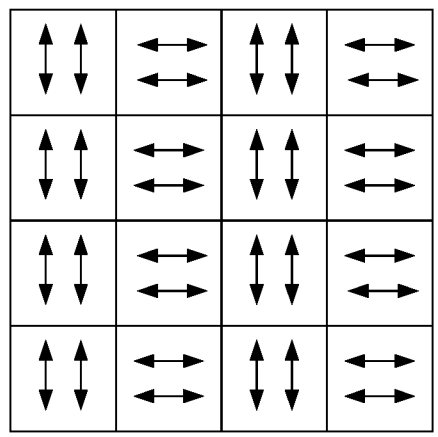
FIG. 10B is a schematic diagram of a polarizer array including two types of polarization units according to an embodiment of this application.
Figure 10C:
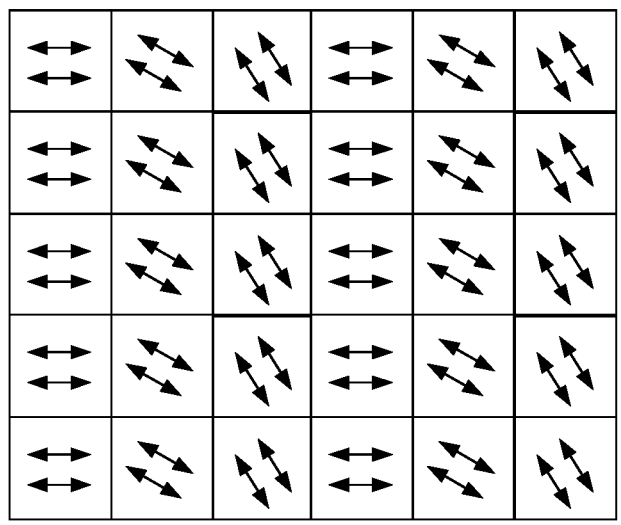
FIG. 10C is a schematic diagram of a polarizer array including three types of polarization units according to an embodiment of this application.

Refer to FIG. 10A. This embodiment provides a polarizer array. The polarizer array includes multiple polarizers arranged in a same plane, and the polarizer includes the four types of polarization units shown in FIG. 7. A quantity of polarizers included in the polarizer array may be adjusted based on a size of an optical lens of an electronic device, and the quantity of polarizers included in the polarizer array is not specifically limited. Refer to FIG. 10C, a polarizer array includes multiple polarizers arranged in a same plane, and the polarizer includes the three types of polarization units shown in FIG. 8. Refer to FIG. 10B, a polarizer array includes multiple polarizers arranged in a same plane, and the polarizer includes the two types of polarization units shown in FIG. 2.

Figure 11:
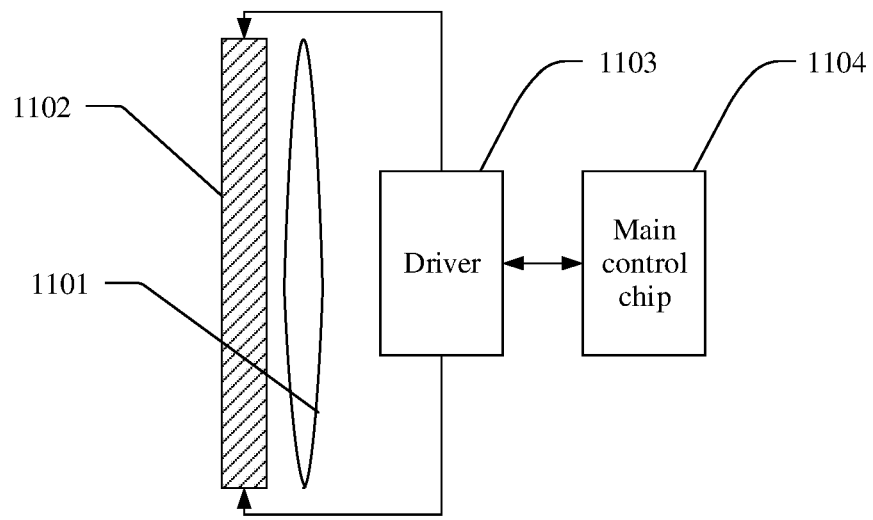
FIG. 11 is a schematic diagram depicting an example structure of an electronic device according to an embodiment of this application.

Refer to FIG. 11. A polarizer array may be used in an electronic device. The electronic device includes an optical lens 1101, a driver, and a polarizer array 1102. The polarizer array and the optical lens are sequentially disposed along a light incidence direction. An electrode layer of a first liquid crystal cell and an electrode layer of a second liquid crystal cell in each polarization unit in the polarizer array 1102 are respectively connected to the driver by using a switch, and the switch may be a pixelized electrode (for example, a thin film transistor (thin film transistor, TFT)). The driver 1103 is connected to a main control chip 1104, and the driver may be configured to supply power to the polarizer array. The main control chip is configured to send a control signal to the driver, and the driver controls, based on the control signal, to apply a voltage to a first liquid crystal cell and/or a second liquid crystal cell in each polarization unit. The electronic device may be an electronic product including a camera, such as a mobile phone, a tablet computer (Pad), a notebook computer, or a surveillance camera. The polarizer array may be superimposed on the camera for use. The polarizer array may also be used in an electronic device including an optical lens, such as a virtual reality (virtual reality, VR) terminal device and an augmented reality (augmented reality, AR) terminal device.

The following describes a polarization-controllable method.

In this application, a state of the polarizer array is controlled by controlling a state of connectivity between the electrode layer of the first liquid crystal cell and the power supply and a state of connectivity between the electrode layer of the second liquid crystal cell and the power supply in each polarization unit.

First, several states of the polarizer array are described.

A first state of the polarizer array: multiple types of polarization units in the polarizer array are in a half-on state. When the polarizer array is in the first state, the polarizer array is configured to polarize incident light, to obtain polarized light in different directions.

A second state of the polarizer array: An electrode layer of a first liquid crystal cell and an electrode layer of a second liquid crystal cell of each type of polarization unit are disconnected from the power supply, that is, each type of polarization unit is in an off state. When the polarizer array is in the second state, a light transmittance of emergent light that passes through the polarizer array is less than a first threshold, and the polarizer array implements a function of light shielding.

A third state of the polarizer array: An electrode layer of a first liquid crystal cell and an electrode layer of a second liquid crystal cell of each type of polarization unit are connected to the power supply, that is, each type of polarization unit is in an on state. When the polarizer array is in the third state, a light transmittance of the polarizer array is greater than a second threshold, and the polarizer array implements a function of light transmission.

A fourth state of the polarizer array: The polarizer array is controlled based on regions. The polarizer array includes a first region and a second region. Electrode layers of first liquid crystal cells and second liquid crystal cells of all polarization units in the first region in the polarizer array are connected to the power supply. Electrode layers of first liquid crystal cells and second liquid crystal cells of all polarization units in the second region in the polarizer array are disconnected from the power supply. The polarizer array is in the fourth state. When the polarizer array is in the fourth state, a light transmittance of the second region is less than a first threshold, that is, the second region is for light shielding. A light transmittance of the first region is greater than a second threshold, and the first region is for light transmission. It should be noted that, the first region may be a contiguous region, or may be a discontiguous region. The second region may be a contiguous region, or may be a discontiguous region.

In this embodiment of this application, the polarizer array is disposed in front of the camera (in a light incidence direction) of the electronic device. Different states of the polarizer array are controlled, so that the electronic device can switch between different states of a hidden camera, an exposed camera (normal photographing), and polarization imaging, and a response speed is fast. In addition, the polarization unit in the polarizer in this application uses a structure of laminated liquid crystal cells. Performance is stable, a service life is long, and costs are low. When the polarization unit is in an on state (when both liquid crystal cells are powered on), the light transmittance is high. When the polarization unit is in an off state (when both liquid crystal cells are powered off), low light transmittance is implemented by superimposing polarized light in two polarization directions that are perpendicular to each other. It is effective in light shielding and the camera is hidden. The polarizer array has a simple structure and is suitable for large-scale applications. The liquid crystal process is mature, no customized detector and no fixed polarizer are needed, and production costs are low. The following describes a polarization-controllable method in this application with reference to an application scenario.

Figure 12:
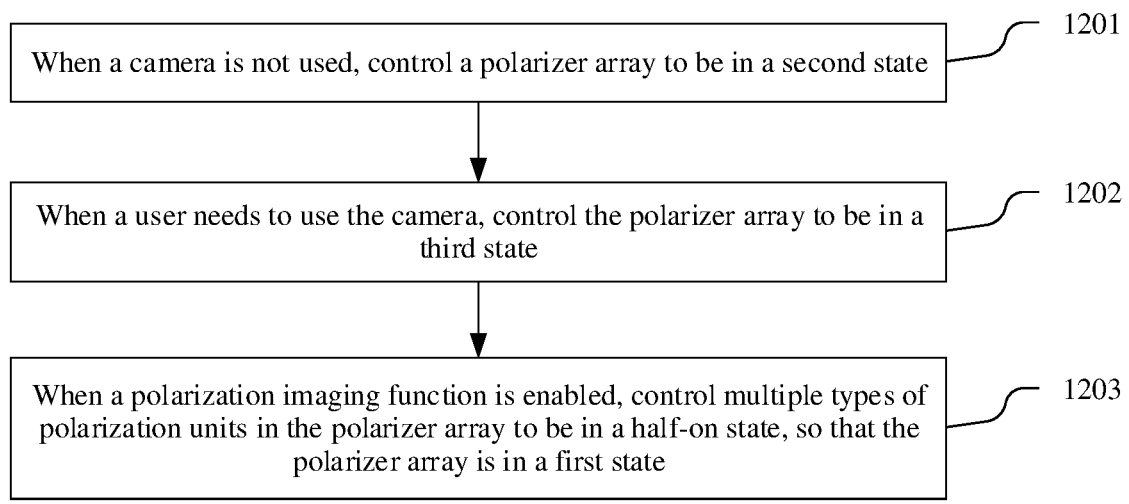
FIG. 12 is a schematic flowchart of example steps of a polarization-controllable method according to an embodiment of this application.

In a first application scenario, an example in which the electronic device is a mobile phone is used. In this example, the polarizer array includes four types of polarization units. Refer to FIG. 12. A polarization-controllable method may include the following steps:

Step 1201: When the camera is not used, control the polarizer array to be in a second state.

Figure 13:
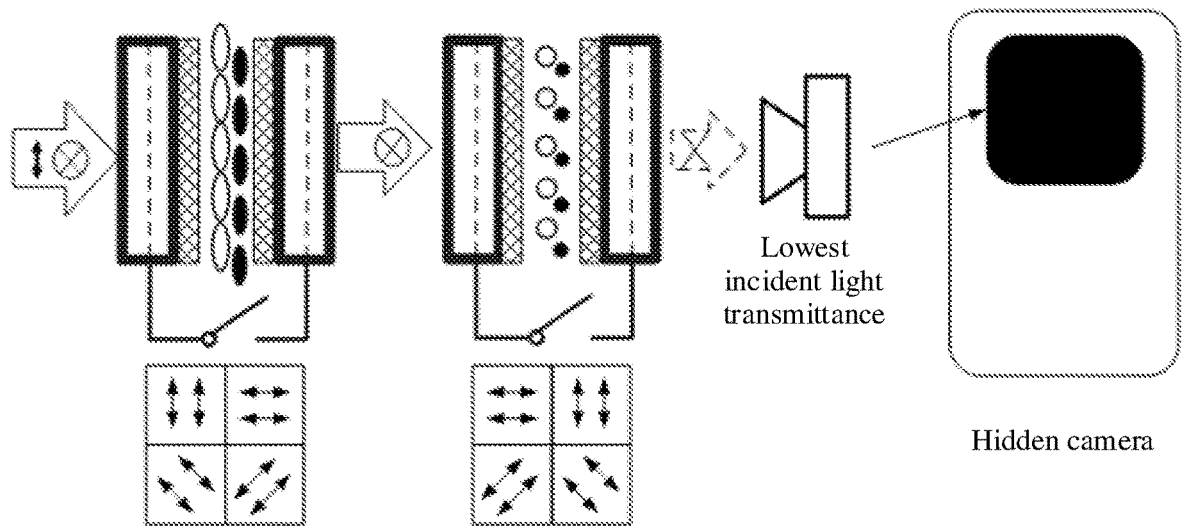
FIG. 13 is a schematic diagram of an application scenario of a polarizer array according to an embodiment of this application.

Refer to FIG. 13. When the polarizer array is in the second state, a light transmittance of the polarizer array is very low, the polarizer array implements a function of light attenuation, and a light absorption band of a dye molecule in the polarizer array is in a range of 250 nm to 1200 nm, with infrared light and visible light being absorbed. The polarizer array is almost black, to visually hide the camera. The polarizer array is equivalent to a light shielding plate. In actual production, different dye molecules may be selected based on a color of a mobile phone casing, so that when the polarizer array is in the second state, a color of an area of the camera is similar to the color of the mobile phone casing, and the camera is visually hidden, improving aesthetics of the mobile phone.

Step 1202: When a user needs to use the camera, control the polarizer array to be in a third state.

The mobile phone receives a second operation input by the user, where the second operation triggers use of the camera. The mobile phone controls, based on the second operation, the polarizer array to be in the third state. The second operation is an operation that the user taps a function key such as photographing or video recording, or the second operation may be a voice control operation.

Figure 14:
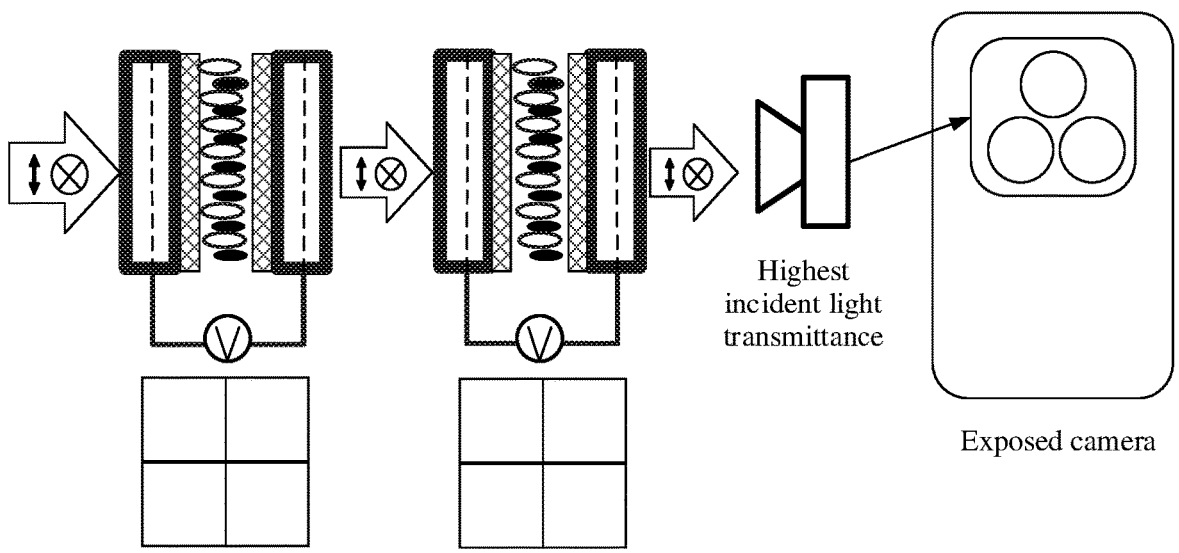
FIG. 14 is a schematic diagram of another application scenario of a polarizer array according to an embodiment of this application.

Refer to FIG. 14. The mobile phone controls all types of polarization units in the polarizer array to be in an on state. In this case, a light transmittance of the polarizer array is greater than a second threshold, and incident light may pass through the polarizer array to be incident to the camera. The polarizer array is visually transparent to the user, and the user can see a lens hidden on the side of the polarizer array. Light can be incident to the camera. In this case, the user may take a photo or shoot a video where the camera is used. For example, the camera captures an image of a scene, and the user may also see a preview image on a screen.

Step 1203: When a polarization imaging function is enabled, control multiple types of polarization units in the polarizer array to be in a half-on state, so that the polarizer array is in a first state.

Emergent light that passes through one type of polarization unit is polarized light in one direction. The polarizer array is configured to polarize incident light, to obtain polarized light in different directions. The half-on state is: In a same polarization unit, an electrode layer of a first liquid crystal cell is connected to the power supply, and an electrode layer of a second liquid crystal cell is disconnected from the power supply. Alternatively, the electrode layer of the first liquid crystal cell is disconnected from the power supply, and the electrode layer of the second liquid crystal cell is connected to the power supply.

Figure 15:
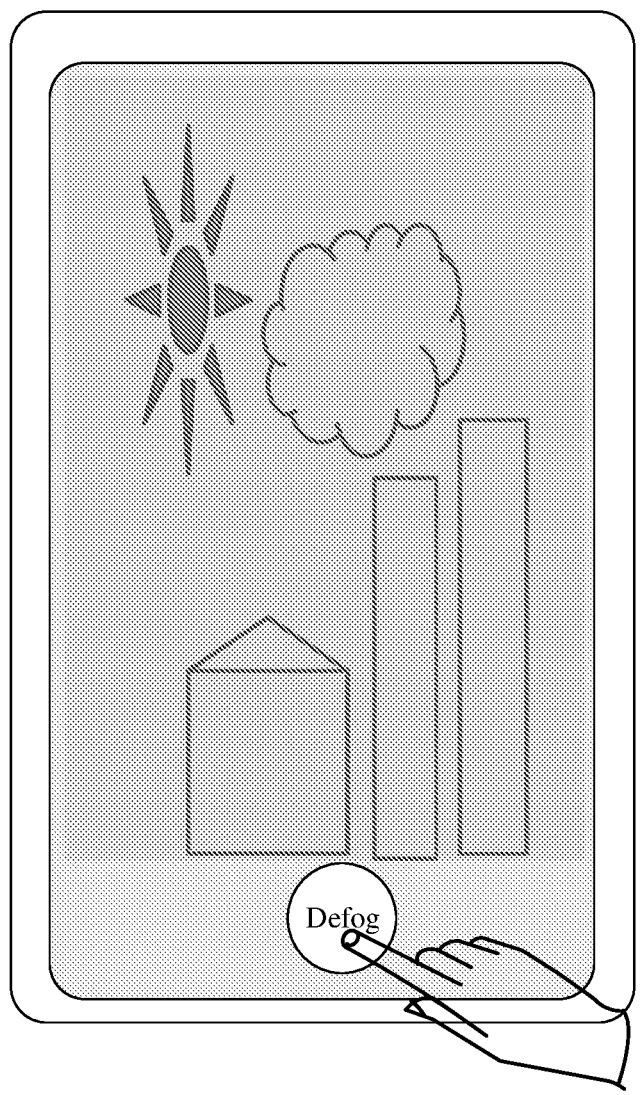
FIG. 15 is a schematic diagram of an example scenario of an electronic device operation according to an embodiment of this application.

Trigger conditions for enabling the polarization imaging function include:

1. Active triggering by the user, the mobile phone receives a first operation input by the user, where the first operation triggers the electronic device to enable the polarization imaging function. Refer to FIG. 15. For example, the first operation is a tapping operation, a sliding operation, or the like. When previewing an image, the user taps a function key of polarization imaging (such as defogging, enhancement, or beautification) on a screen to trigger enabling of the polarization imaging function. In this example, the polarization imaging function is enabled by using a user operation, to control the polarizer array to be in the first state. The apparatus controls the state of the polarizer array by receiving the first operation of the user, providing a triggering manner for controlling the state of the polarizer array, so that the state of the polarizer array can be controlled according to a user requirement.

2. Automatic triggering by the electronic device: The mobile phone collects a current preview image, obtains an image feature of the preview image, and then the electronic device is triggered to enable the polarization imaging function based on the image feature. For example, the mobile phone collects a preview image, and obtains an image feature of the preview image. For example, one thing obviously impacted by haze is an edge of a distant object. For example, an edge of a distant tree and a contour of a mountain in the image become blurred. In this case, a contour feature in the preview image may be extracted, and whether defogging processing needs to be performed is determined based on the contour feature. When the mobile phone determines that defogging processing needs to be performed on the current preview image, the mobile phone automatically triggers enabling of a polarization imaging (for example, defogging) function. User participation is not needed. This reduces operation steps of the user and improves user experience.

Figure 16:
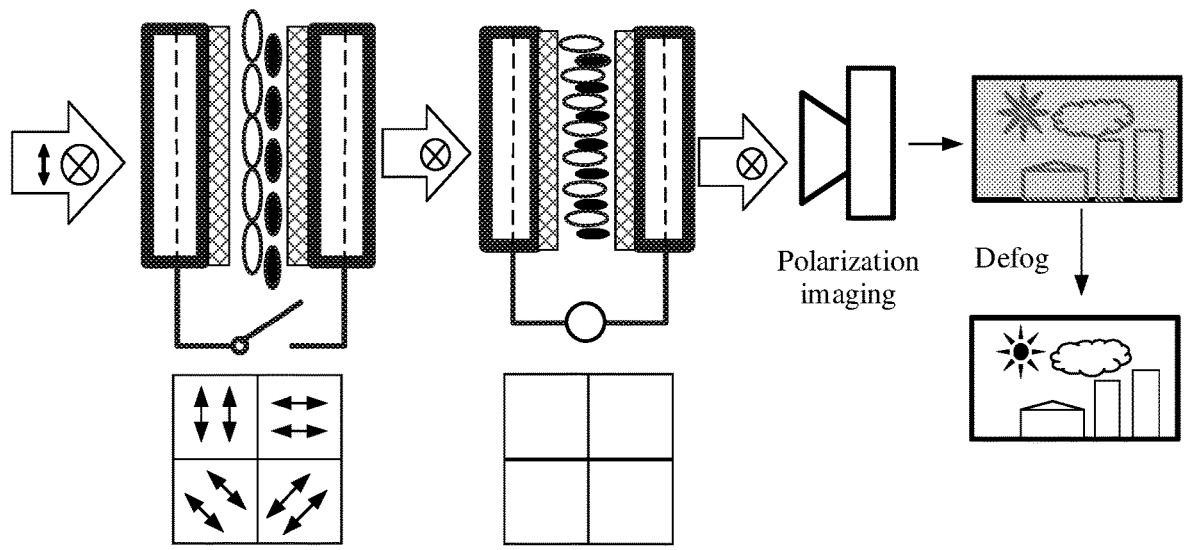
FIG. 16 is a schematic diagram of an application scenario of polarization imaging according to an embodiment of this application.

Refer to FIG. 16. When the polarization imaging function is enabled, the polarizer array is controlled to be in the first state. In addition, polarized light in different directions is obtained at different moments, and polarization imaging is performed by using the obtained polarized light in different directions. The polarization imaging includes but is not limited to defogging, denoising, 3D topography, and the like.

It should be noted that, when a function that activates the camera does not need to be enabled, step 1202 and step 1203 may not be performed, that is, the polarizer array is in the first state, to hide the camera. When the user triggers a function that activates the camera, with only normal photographing or video recording being needed and polarization imaging not needed, step 1203 may not be performed. When the camera is already activated, and the camera is in a state for photographing, step 1203 may be directly performed, and step 1201 and step 1202 are not performed.

For example, the polarization imaging method in this example is described by using a defogging scenario.

In a first example, the polarizer array includes four types of polarization units, and four polarization directions are respectively 0°, 45°, 90°, and 135°. The four types of polarization units function at different moments, and collect light in four polarization directions by using the camera. For example, steps are as follows: At a first moment, all first polarization units (polarization units whose polarization directions are 0°) are controlled to be in a half-on state, the other three types of polarization units are controlled to be in an off state, and the camera collects a first image. At a second moment, all second polarization units (polarization units whose polarization directions are) 45° are controlled to be in a half-on state, the other three types of polarization units are controlled to be in an off state, and the camera collects a second image. At a third moment, all third polarization units (polarization units whose polarization directions are 90°) are controlled to be in a half-on state, the other three types of polarization units are controlled to be in an off state, and the camera collects a third image. At a fourth moment, all fourth polarization units (polarization units whose polarization directions are 135°) are controlled to be in a half-on state, the other three types of polarization units are controlled to be in an off state, and the camera collects a fourth image. Finally, scene information collected in four polarization directions is obtained for image processing.

Based on a Stokes vector-based polarization defogging technology, the camera collects image information in different polarization directions, and the main control chip obtains polarization degree information and polarization angle information based on polarized images in different directions, and further performs defogging processing on the images based on the polarization degree information and the polarization angle information.

First, four images whose polarization directions are respectively 0°, 45°, 90°, and 135° are collected, and are respectively denoted as I(0), I(45), I(90), and I(135). In this case, the Stokes vector may be represented as:

$$\begin{cases} S_0 = I(0) + I(90) \\ S_1 = I(0) - I(90) \\ S_2 = I(45) - I(135) \end{cases} \quad \text{formula (1)}$$

S0 is a total light intensity in the scene, that is, I; S1 is an intensity difference between a horizontal direction and a vertical direction; and S2 is an intensity difference between a 45° direction and a 135° direction. According to the foregoing formula (1), the polarization degree p and the polarization angle θ may be obtained as follows:

$$P = \frac{\sqrt{S_1^2 + S_2^2}}{S_0}, \quad \text{formula (2)}$$

$$\theta = \frac{1}{2}\arctan\frac{S_2}{S_1}, \quad \text{formula (3)}$$

A polarization angle value of each pixel of the image is calculated according to the formula (3), and a polarization angle value with a maximum occurrence probability is selected as an atmospheric light polarization angle $\theta_A$. The polarization degree is calculated from pixels that meet the atmospheric light polarization angle, and a maximum value is selected as an atmospheric light polarization degree $P_A$.

Then, an atmospheric light intensity polarization part $A_p$ is obtained.

$$A_p = \frac{I(0) - S_0(1-p)/2}{\cos^2\theta_A} = \frac{I(90) - S_0(1-p)/2}{\sin^2\theta_A}, \quad \text{formula (4)}$$

Then, an atmospheric light intensity of each pixel may be obtained according to $$A = A_p/P_A.$$

In addition, an atmospheric light intensity in an infinite distance is estimated based on P and θ. Finally, a defogged image may be obtained based on the atmospheric light intensity estimated based on the Stokes vector and the atmospheric light intensity in the infinite distance.

It should be noted that the foregoing is merely described by using a defogging algorithm as an example. In this example, polarization imaging of different effects may be performed by selecting different algorithms for the obtained polarized images in the four directions. For example, image enhancement such as target detection and classification may also be performed based on the polarized images in the four directions.

Figure 17:
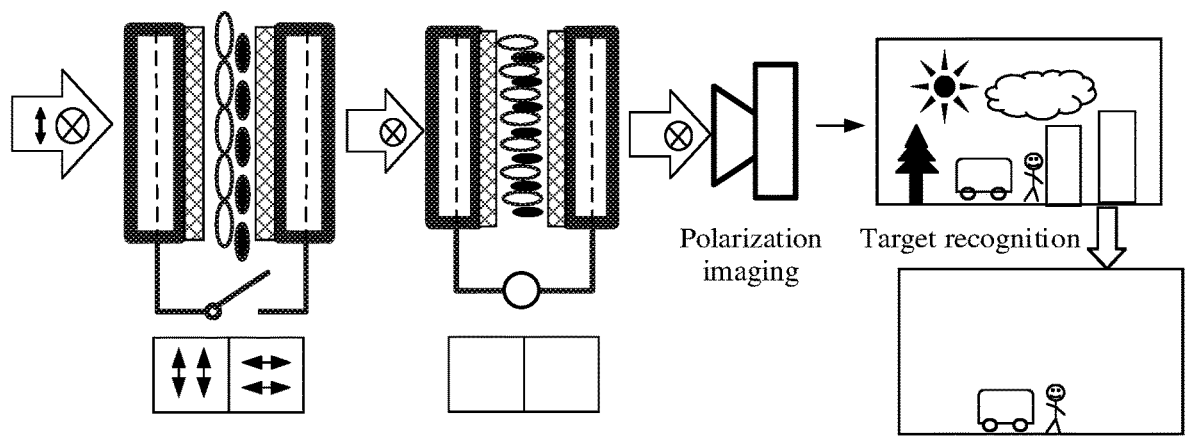
FIG. 17 is a schematic diagram of another application scenario of polarization imaging according to an embodiment of this application.

Refer to FIG. 17. In a second example, the polarizer array includes two types of polarization units (as shown in FIG. 10B). A difference between this example and the example in the first scenario lies in that the polarizer array includes a different quantity of types of polarization units. The polarizer array in this example includes two types of polarization units (a first polarization unit and a second polarization unit), and two polarization directions are 0° and 90° respectively. The two types of polarization units function at different moments, and collect light in two polarization directions by using the camera. For example, at a first moment, all first polarization units (polarization units whose polarization directions are 0°) are controlled to be in a half-on state, second polarization units are controlled to be in an off state, and the camera collects a first image. At a second moment, all the second polarization units (polarization units whose polarization directions are 90°) are controlled to be in a half-on state, the first polarization units are controlled to be in an off state, and the camera collects a second image, that is, two polarized images in orthogonal directions are obtained. The polarized images in the two directions are used for polarization imaging. For example, a target may be classified (or identified), polarization feature information of the target can reflect information such as a texture, roughness, and shape of the target, and a contrast between the target and a background may be enhanced by using polarization imaging, to implement target detection or target enhancement. For a man-made object in a natural environment, because a smooth man-made object has a smaller depolarization effect on polarized light than a rough object in nature, a polarization imaging detection technology can better identify the man-made target in the natural background. This is applicable to identification of a man-made target (for example, identification of a vehicle and a person) in a complex background.

In this example, the orientation of the alignment film of the polarization unit in the polarizer array is simplified, and polarized images in two orthogonal directions may be obtained by using the polarizer array. Uniformity in liquid crystal distribution directions in a power-off state is improved, so that a polarization imaging effect is better. However, because there are only two directions, a polarization degree can be calculated by using only a difference method, and a polarization angle cannot be calculated. Therefore, an application scenario may be limited. The solution may be applied to a polarization imaging scenario in which only a polarization degree is needed.

Figure 18:
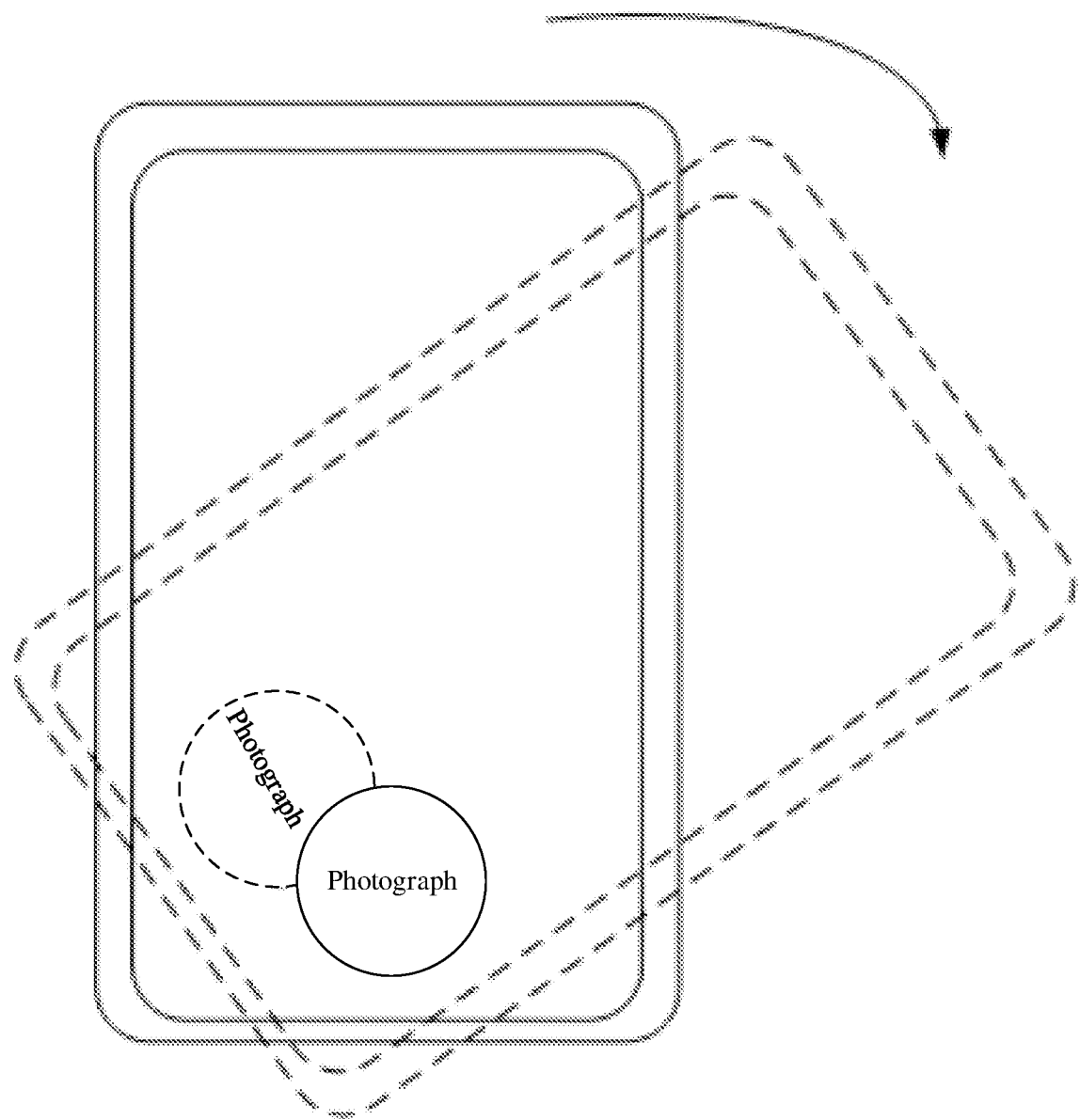
FIG. 18 is a schematic diagram of another example scenario of an electronic device operation according to an embodiment of this application.

To extend an application scenario, the user may find a proper shooting angle through an operation of manual rotation. This is implemented by rotating the electronic device during photographing and taking photos for multiple times. Refer to FIG. 18 for an example. When the user is taking a photo, rotating the mobile phone in a same plane is equivalent to rotating the polarizer array in the same plane, and a polarization image in another direction may be obtained. For example, at a third moment, the first polarization unit is in a half-on state, and the second polarization unit is in an off state. Alternatively, the second polarization unit is in a half-on state, and the first polarization unit is in an off state. The user rotates the mobile phone, and the mobile phone detects a polarization direction of polarized light obtained at a current location. If the polarization direction of the polarized light obtained currently meets a preset value (for example, 45° or 60°), the mobile phone outputs a prompt message. For example, the mobile phone outputs a prompt tone, and the user stops rotating the mobile phone according to the prompt tone, and takes a photo at a current shooting angle of the mobile phone. The mobile phone may obtain image information in the current polarization direction. Similarly, at a fourth moment, the mobile phone may be rotated to determine a proper shooting angle, and then outputs a prompt tone to remind the user that a current angle at which the mobile phone is located is a proper shooting angle. The mobile phone receives a photographing operation input by the user, and obtains image information in another polarization direction. Then, the mobile phone may preprocess the collected images in the multiple polarization directions, including binarizing a color picture, obtain a Stokes parameter (for example, S0, S1, and S2) image by using the collected multiple polarized images, and further calculate parameters of polarization angle and polarization degree to obtain polarization feature information of the target, implementing target detection (identification) and the like.

Figure 19:
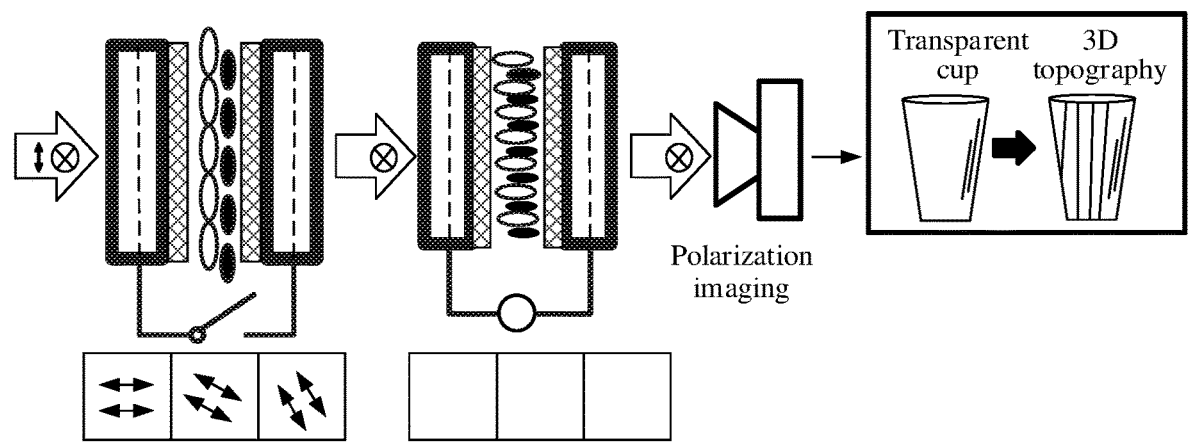
FIG. 19 is a schematic diagram of another application scenario of polarization imaging according to an embodiment of this application.

Refer to FIG. 19. In a third example, the polarizer array includes three types of polarization units (as shown in FIG. 10C). A difference between this example and the example in the first scenario lies in that the polarizer array includes a different quantity of types of polarization units. The polarizer array in this example includes three types of polarization units (a first polarization unit, a second polarization unit, and a third polarization unit), and three polarization directions are 0°, 60°, and 120° respectively. At least three pictures of different linear polarization states are taken at different moments, so that an intensity, a polarization degree, and a polarization angle of reflection by a surface of a transparent object can be calculated, to measure a surface topography (point cloud) of the transparent object. This may also be used to remove reflection of a glass window, or the like.

For example, at a first moment, all first polarization units (polarization units whose polarization directions are 0°) are controlled to be in a half-on state, and the other two types of polarization units are in an off state, and the camera collects a first image; at a second moment, all second polarization units (polarization units whose polarization directions are 60°) are controlled to be in a half-on state, and the other two types of polarization units are in an off state, and the camera collects a second image; and at a third moment, all third polarization units (polarization units whose polarization directions are 120°) are controlled to be in a half-on state, the other two types of polarization units are in an off state, and the camera collects a third image. Polarized images in three directions (for example, 0°, 60°, and 120°) may be obtained.

For example, a method for obtaining a 3D topography image by using polarized images in the three directions is as follows:

It is assumed that light propagates along a z axis in a rectangular coordinate system, and a Stokes parameter Stokes vector of the light wave is as follows:

$$S=[I\ Q\ U\ V],\quad\text{formula (5)}$$

I represents a light intensity, Q represents a light intensity difference between a linear polarization component in an x axis direction and a linear polarization component in a y axis direction, U represents a light intensity difference between linearly polarized light components that are in the x-y plane and that respectively form a 45° angle and a 135° angle with the x axis direction, and V represents a light intensity difference between left-handed circularly polarized light and right-handed circularly polarized light. In nature, V is usually very small, and therefore V is approximately 0. The polarization degree p and polarization angle θ are expressed as follows:

$$P = \frac{\sqrt{Q^2 + U^2 + V^2}}{I},\quad\text{formula (6)}$$

$$\theta = \frac{1}{2}\tan^{-1}\left(\frac{U}{Q}\right),\quad\text{formula (7)}$$

Therefore, only the Stokes vector is needed to calculate the polarization degree and polarization angle.

It is assumed that the polarization direction of the polarization unit is a, and the light intensity received after the light beam passes through the polarization unit is:

$$I(\alpha)=(I+Q\cos 2\alpha+U\sin 2\alpha),\quad\text{formula (8)}$$

I, Q, and U can be obtained from light intensity information collected based on three a, that is, I(0°), I(60°), and I(120°). Therefore, the polarization degree may be obtained according to the formula (6), and the polarization angle may be obtained according to the formula (7).

In this example, 3D topography detection is performed by using polarization imaging. When an electromagnetic wave is reflected from an object surface, different incidence angles cause different polarization states of the reflected light. Polarization state parameters (that is, a polarization degree and a polarization angle) are detected, and a normal direction of the object surface may be calculated based on the polarization degree and the polarization angle. Points clouds are obtained based on normal directions of all points, and the 3D topography of the object is fit by using a point cloud reconstruction algorithm.

In this embodiment, in the first example, the polarizer array includes four types of polarization units. Polarized light in four polarization directions may be obtained by using the polarizer array, and polarization imaging is extensively applied to a wide range of scenarios. In the second example, the polarizer array includes two types of polarization units. Polarized light in two directions may be obtained by using the polarization array. During polarization imaging, polarized light in only two directions can be obtained. This simplifies the orientation of the alignment film, so that a light flux in a polarization direction, for example, 0° polarization, can be increased, and exposure time of each frame during polarization imaging at different moments can be reduced. In the third example, the polarizer array includes three types of polarization units. Polarized light in three directions can be obtained by using the polarization array. Polarized light in three directions can be obtained during polarization imaging. Compared with the first example, the orientation of the alignment film is simplified, so that a light flux in a polarization direction can be increased, and exposure time of each frame during polarization imaging at different moments can be reduced. Compared with the second example, because polarized light in three directions is obtained, when polarization imaging is performed by using the polarized light, application scenarios increase.

Figure 20:
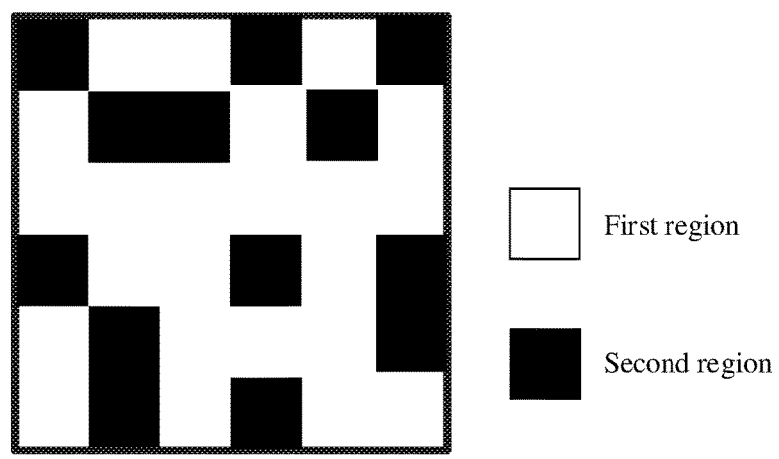
FIG. 20 is a schematic diagram of still another application scenario of a polarizer array according to an embodiment of this application.

Refer to FIG. 20. In a fourth example, the method may further include: The electronic device controls the polarizer array to be in a fourth state. When the polarizer array is in the first state, the first region presents a high light transmittance, that is, the first region is a light transmission region. The second region presents a low light transmittance, that is, the second region is a light shielding region. In this case, the polarizer array is equivalent to a coded-aperture mask for aperture coding, so that a part of light passes through and another part of the light is shielded. The first region and the second region in the coded-aperture mask may be flexibly controlled based on a scenario. The polarizer array may be equivalent to a spatial filter, and an image shot by a camera with the polarizer array has more information about high frequencies in spatial domain. Coded-aperture imaging includes encoding and decoding. On an encoding end, an original image is projected to a polarizer array according to a principle of optics, light passes through the polarizer array, an image sensor collects a projected image, and projected images are superimposed to form a two-dimensional coded image. On a decoding end, a series of filtering and reconstruction algorithms are used to process the two-dimensional coded image, and finally a clear image is obtained through reconstruction. The function of decoding is to improve a spatial resolution of the image and improve performance of an imaging system.

In this example, the polarizer array may perform flexible region-based control, so that some regions in the polarizer array transmit light and some regions shield light. The polarizer array is equivalent to a coded-aperture mask, and may be used for coded-aperture imaging. Compared with a conventional coded-aperture mask, the polarizer array in this example may flexibly control a light shielding region and a light transmission region according to a required scenario.

Figure 21:
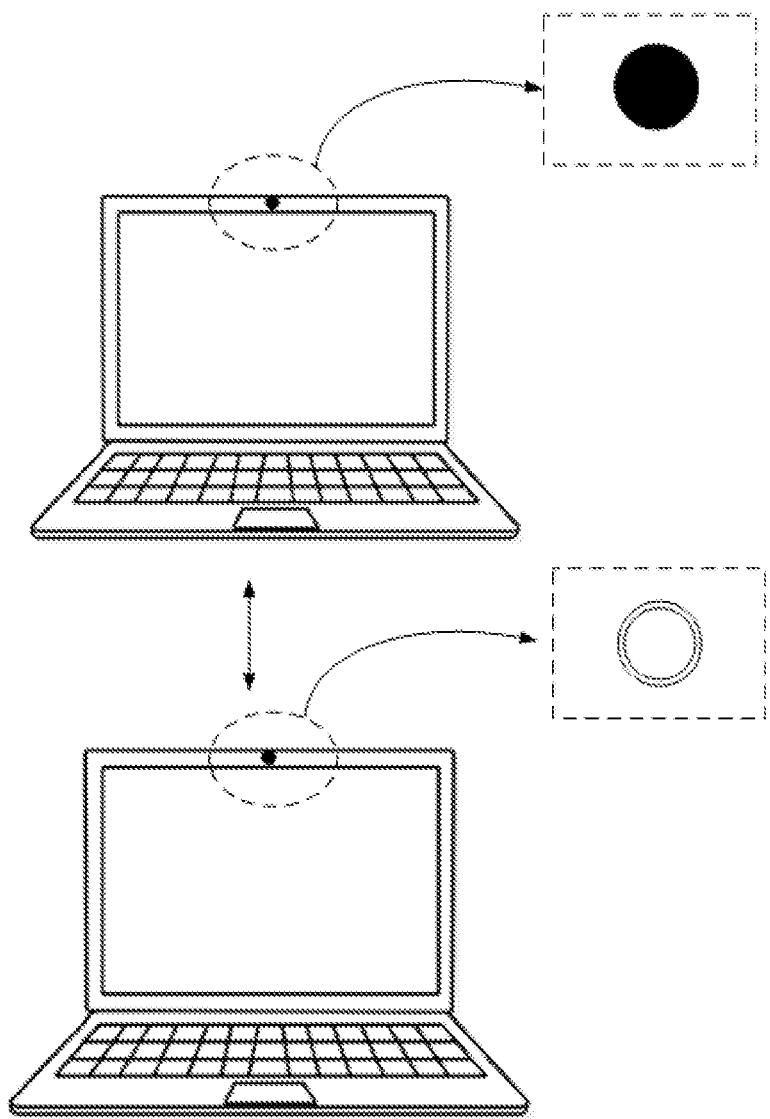
FIG. 21 is a schematic diagram of yet another application scenario of a polarizer array according to an embodiment of this application.

In a second application scenario, refer to FIG. 21. An example in which the electronic device is an electronic device configured with a front-facing camera, such as a mobile phone, a tablet computer, or a notebook computer is used. An example in which the electronic device is a notebook computer is used for description in this example.

When the camera is not used, the polarizer array is in the second state. The light transmittance of the polarizer array is very low, and this blocks the camera.

After the electronic device receives an operation that is input by a user and that triggers use of the camera, the electronic device controls the polarizer array to be in the third state. In other words, the polarizer array is in a high transmittance state. In this case, incident light can be incident to the camera, and the camera can collect an image.

In a conventional technology, there may be a case in which when the user uses the electronic device, the camera is invoked by an application program (application, APP) with the user not informed. Image information of the user is collected by using the camera, which results in user privacy leaks. However, in this application, when the polarizer array is used in the front-facing camera of the electronic device, and the camera is not used, the polarizer array is in the second state. The light transmittance of the polarizer array is very low, and this blocks the camera. This prevents the camera from being invoked by the APP when the user is not informed, which results in user privacy leaks. When the user allows use of the camera, that is, after the electronic device receives a second operation input by the user, the second operation triggers use of the camera, the user allows use of the camera, and the electronic device controls the polarizer array to be in the third state, so that incident light can be incident to the camera and the camera can normally collect an image. It should be noted that the second operation in this example may be a tapping operation, a screen sliding operation, a voice operation, or the like received by using a display, or may be an authorization operation of the user.

For example, in an application scenario, the user is using the notebook computer. If the user uses an APP, and the APP invokes the front-facing camera with the user not informed, the polarizer array blocks the camera, and user privacy is not leaked. When the user uses an APP, if the APP prompts the user whether to use the camera, the user may perform a second operation. When "Yes" is tapped, the electronic device controls the polarizer array to be in the third state. Alternatively, when the user uses an APP and needs to invoke the camera by using the APP, for example, for a video function or a photographing function, the user may actively input a second operation to activate the camera, and the electronic device controls the polarizer array to be in the third state. In this case, the camera can be normally used, and image information is collected by using the camera. Alternatively, in another scenario, when an APP invokes the camera, camera activation is triggered. After detecting an operation of activating the camera, the electronic device controls the polarizer array to be in the third state. In this case, the polarizer array transmits light, and the user can visually determine that the camera is photographing, that is, an APP currently activates the camera in the background by performing an unauthorized operation. In this case, the user may check which APP performs an unauthorized operation and deal with it, for example, uninstalling the APP or changing an APP setting, to avoid user privacy leaks.

In a third application scenario, the electronic device may be mixed reality (mixed reality, MR) glasses. The polarizer arrays in FIG. 10A to FIG. 10C may also be used in an optical lens of the MR glasses, to implement switching between virtual reality (virtual reality, VR) glasses and augmented reality (augmented reality, AR) glasses.

Figure 22:
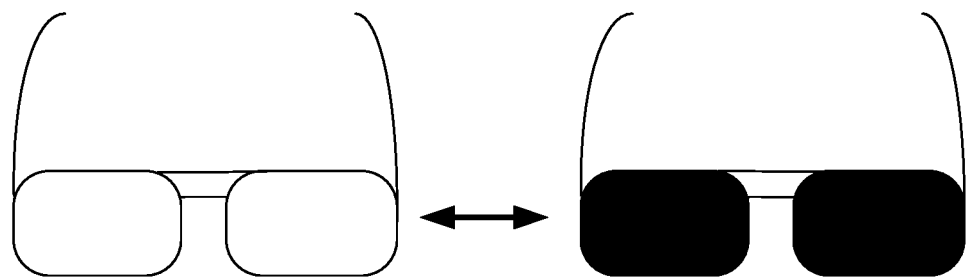
FIG. 22 is a schematic diagram of still yet another application scenario of a polarizer array according to an embodiment of this application.

As shown in FIG. 22, the optical lens of the AR glasses transmits light, and the optical lens of the VR glasses does not transmit light. In this example, whether the glasses are light shielding may be implemented by controlling a state of the polarizer array. For example, the polarizer array is controlled to be in the second state, that is, the glasses are in a light shielding state. In this case, the glasses are switched to VR glasses. The polarizer array is controlled to be in the third state. In this case, the glasses are in a light transmission state. In this case, the glasses are switched to AR glasses.

In this application scenario, a state of the polarizer array may be controlled, to control the polarizer array to switch between light shielding and light transmission, so that switching between AR glasses and VR glasses can be implemented.

In a fourth application scenario, the polarizer array may also be disposed in front of a car lamp, to implement intelligent shading of the car lamp, and implement anti-glare for a driver of an oncoming vehicle.

For example, road information may be collected by using a camera, and then the road information is transmitted to a main control chip, and the main control chip processes and analyzes the road information. For example, when it is detected that there is an oncoming vehicle, there is a road sign ahead, or there is another object reflecting light, the main control chip sends a control signal to a drive chip, and the drive chip controls which polarization units in the polarizer array transmit light (that is, are in an on state) and which polarization units do not transmit light (that is, are in an off state), to dynamically adjust emitted light, so that eyes of the driver are in a comfortable state, and anti-glare may further be implemented for the driver of the oncoming vehicle. The polarizer array in this example uses a mature liquid crystal technology, with easy control and low costs.

Figure 23:
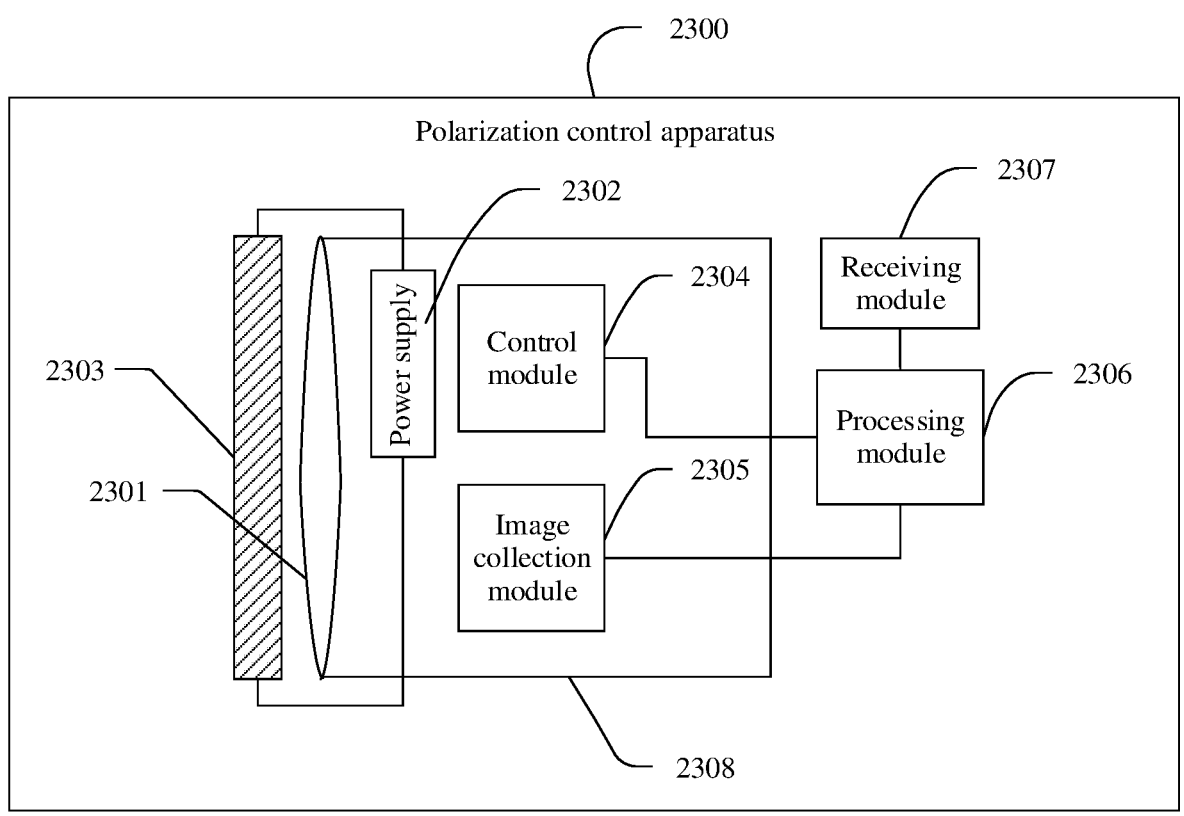
FIG. 23 is a schematic diagram depicting an example structure of an apparatus according to an embodiment of this application.

Refer to FIG. 23. An embodiment of this application further provides a polarization control apparatus. The polarization control apparatus 2300 includes an optical lens 2301, a power supply 2302, and a polarizer array 2303. An electrode layer of a first liquid crystal cell and an electrode layer of a second liquid crystal cell in each polarization unit of the polarizer array 2303 are respectively connected to the power supply 2302 by using a switch. The polarizer array 2303 and the optical lens 2301 are sequentially disposed along a light incidence direction. The polarization control apparatus further includes a control module 2304.

The control module 2304 is configured to control a state of the polarizer array 2303 by controlling a state of connectivity between the electrode layer of the first liquid crystal cell and the power supply 2302 and a state of connectivity between the electrode layer of the second liquid crystal cell and the power supply in each polarization unit. The state of the polarizer array 2303 includes a first state, and when the polarizer array 2303 is in the first state, the polarizer array 2303 is configured to polarize light that is incident to the optical lens 2301, to obtain polarized light in different directions.

Optionally, the control module 2304 is further configured to control multiple types of polarization units in the polarizer array 2303 to be in a half-on state, so that the polarizer array 2303 is in the first state, where emergent light of one type of polarization unit is polarized light, and the polarized light is in one direction. The half-on state is: In a same polarization unit, an electrode layer of a first liquid crystal cell is connected to the power supply 2302, and an electrode layer of a second liquid crystal cell is disconnected from the power supply 2302.

Optionally, the polarization control apparatus further includes a receiving module 2307.

The receiving module 2307 is configured to receive a first operation input by a user, where the first operation triggers the polarization control apparatus to enable a polarization imaging function.

Optionally, the polarization control apparatus further includes an image collection module 2305 and a processing module 2306.

The image collection module 2305 is configured to collect a preview image.

The processing module 2306 is configured to: extract an image feature of the preview image collected by the image collection module 2305; and enable the polarization imaging function based on the image feature.

Optionally, the image collection module 2305 is further configured to: when the polarizer array 2303 is in the first state, collect image information of a target object in multiple polarization directions.

The processing module 2306 is further configured to generate a polarized image based on the image information that is in the multiple polarization directions and that is collected by the image collection module 2305.

Optionally, the control module 2304 is further configured to control the electrode layer of the first liquid crystal cell and the electrode layer of the second liquid crystal cell of each type of polarization unit to be disconnected from the power supply 2302, so that the polarizer array 2303 is in a second state. When the polarizer array 2303 is in the second state, a light transmittance of the polarizer array 2303 is less than a first threshold.

Optionally, the control module 2304 is further configured to control the electrode layer of the first liquid crystal cell and the electrode layer of the second liquid crystal cell of each type of polarization unit to be connected to the power supply 2302, so that the polarizer array 2303 is in a third state. When the polarizer array 2303 is in the third state, a light transmittance of the polarizer array 2303 is greater than a second threshold.

Optionally, the control module 2304 is further configured to control electrode layers of first liquid crystal cells and second liquid crystal cells of all polarization units in a first region in the polarizer array 2303 to be connected to the power supply 2302, and control electrode layers of first liquid crystal cells and second liquid crystal cells of all polarization units in a second region in the polarizer array 2303 to be disconnected from the power supply 2302, so that the polarizer array 2303 is in a fourth state. When the polarizer array 2303 is the fourth state, a light transmittance of the second region is less than the first threshold, and a light transmittance of the first region is greater than the second threshold.

Optionally, the apparatus includes a camera 2308, the camera 2308 includes the optical lens 2301, and the polarization control apparatus further includes the receiving module 2307.

The receiving module 2307 is configured to receive a second operation input by the user, where the second operation triggers use of the camera.

The control module 2304 is further configured to control, based on the second operation received by the receiving module 2307, the polarizer array 2303 to be in the third state.

In a possible design, the power supply 2302 in this example is a power supply module of the driver in FIG. 11. A function of the control module 2304 in this example is performed by the driver in FIG. 11. In this example, a function of the control module 2304 and a function of the receiving module 2307 are performed by the main control chip in FIG. 11.

An embodiment of this application further provides a polarization control apparatus. The polarization control apparatus 2400 may be an electronic device including a camera, such as a mobile phone, a tablet computer, a notebook computer, or a surveillance camera, or the apparatus may be an electronic device including an optical lens, such as MR glasses. For example, the electronic device is a mobile phone.

Figure 24:
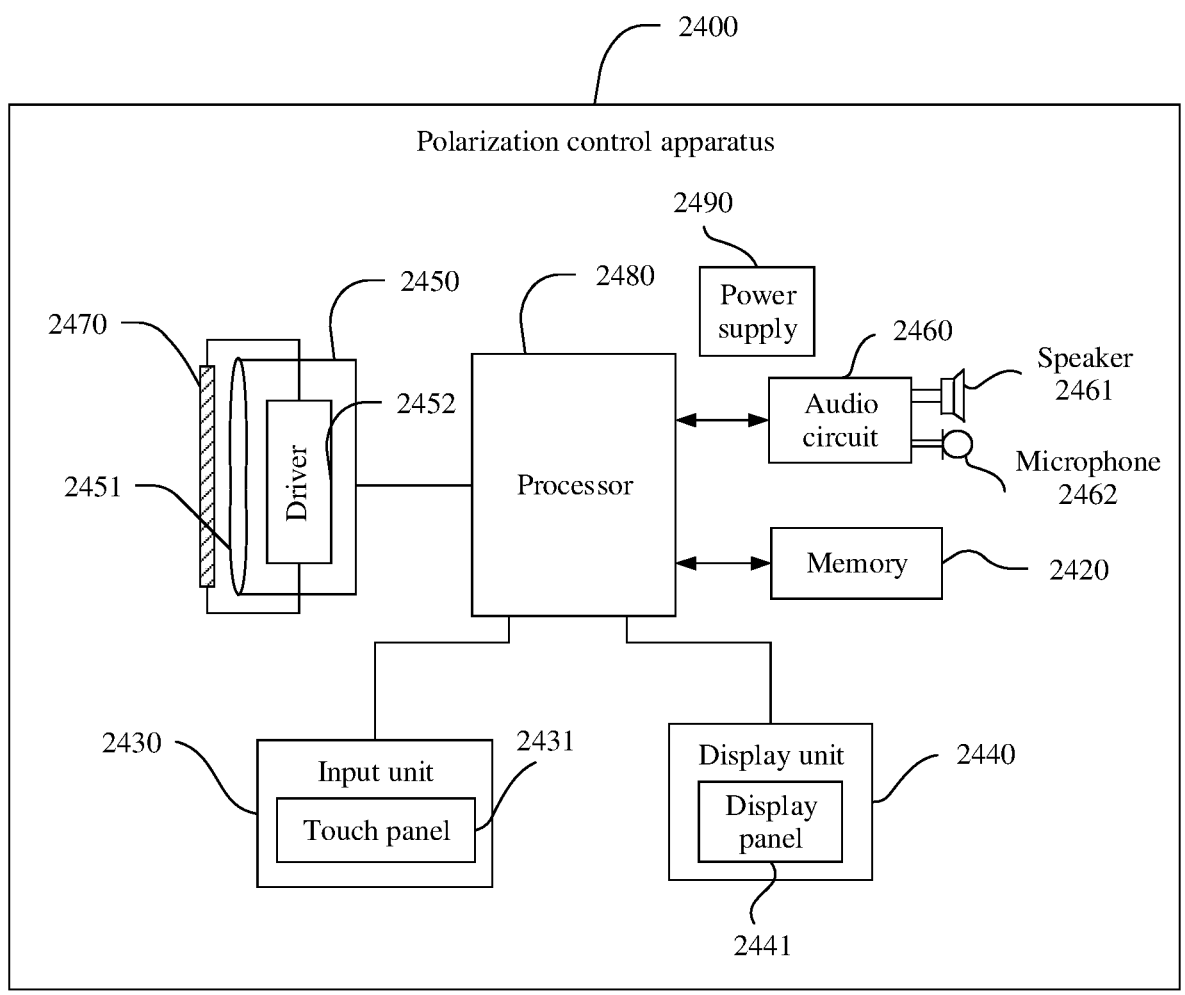
FIG. 24 is a schematic diagram depicting another example structure of an apparatus according to an embodiment of this application.

Refer to FIG. 24. The mobile phone includes components such as a memory 2420, an input unit 2430, a display unit 2440, a camera 2450, an audio circuit 2460, a processor 2480, a power supply 2490, and a polarizer array 2470.

The following describes each component of the mobile phone in detail with reference to FIG. 24.

The memory 2420 may be configured to store a software program and a module, and the processor 2480 runs the software program and the module that are stored in the memory 2420, to execute various function applications of the mobile phone and process data. The memory 2420 may include a high-speed random access memory, and may further include a non-volatile memory, for example, at least one magnetic disk storage component, a flash memory component, or another volatile solid-state storage component.

The input unit 2430 may be configured to receive input digit or character information, and generate a key signal input related to a user setting and function control of the mobile phone. Specifically, the input unit 2430 may include a touch panel 2431. The touch panel 2431, also referred to as a touchscreen, may collect a touch operation performed by a user on or near the touch panel 2431 (for example, an operation performed by the user on the touch panel 2431 or near the touch panel 2431 by using any suitable object or accessory such as a finger or a stylus pen). For example, a first operation and a second operation that are input by the user may be received by using the input unit 2430. The first operation triggers the electronic device to enable a polarization imaging function. For example, the first operation is a tapping operation or a sliding operation. For example, when previewing an image, the user taps a function key of polarization imaging (such as defogging, enhancement, or beautification) on the screen to trigger enabling of the polarization imaging function. The second operation triggers use of the camera. The second operation may be a tapping operation received by using the display, a screen sliding operation, or the like.

The display unit 2440 may be configured to display various image information, for example, image information of polarization imaging and a preview image. The display unit 2440 may include a display panel 2441. Optionally, the display panel 2441 may be configured in a form such as a liquid crystal display or an organic light-emitting diode. In some embodiments, the touch panel 2431 and the display panel 2441 may be integrated to implement input and output functions of the mobile phone.

The camera 2450 includes an optical lens 2451. The polarizer array 2470 and the optical lens 2451 are disposed along a light incidence direction. The camera 2450 may collect polarized images in multiple polarization directions by using the polarizer array 2470.

The mobile phone further includes the power supply 2490 (such as a battery) that supplies power to each component. The power supply 2490 may supply power to a driver 2452 of the camera 2450, and the polarizer array 2470 is connected to the driver 2452 by using a switch.

The processor 2480 is a control center of the mobile phone and is connected to each part of the entire mobile phone by using various interfaces and lines, and performs various functions of the mobile phone and processes data by running or executing the software program and/or module that are stored in the memory 2420 and invoking data stored in the memory 2420, to perform overall monitoring on the mobile phone. Optionally, the processor 2480 may include one or more processing units.

In this application, the processor 2480 is configured to control a state of the polarizer array 2470 by controlling a state of connectivity between the electrode layer of the first liquid crystal cell and the power supply and a state of connectivity between the electrode layer of the second liquid crystal cell and the power supply in each polarization unit.

A first state of the polarizer array 2470: multiple types of polarization units in the polarizer array 2470 are in a half-on state. When the polarizer array 2470 is in the first state, the polarizer array 2470 is configured to polarize incident light, to obtain polarized light in different directions. The processor 2480 may determine polarization degree information and polarization angle information based on polarization images in different directions, and further perform defogging processing, 3D topography, denoising, or the like on the images based on the polarization degree information and the polarization angle information.

A second state of the polarizer array 2470: An electrode layer of a first liquid crystal cell and an electrode layer of a second liquid crystal cell of each type of polarization unit are disconnected from the power supply, that is, each type of polarization unit is in an off state. When the polarizer array 2470 is in the second state, a light transmittance of emergent light that passes through the polarizer array 2470 is less than a first threshold, and the polarizer array 2470 implements a function of light shielding.

A third state of the polarizer array 2470: An electrode layer of a first liquid crystal cell and an electrode layer of a second liquid crystal cell of each type of polarization unit are connected to the power supply, that is, each type of polarization unit is in an on state. When the polarizer array 2470 is in the third state, a light transmittance of the polarizer array 2470 is greater than a second threshold, and the polarizer array 2470 implements a function of light transmission.

A fourth state of the polarizer array 2470: The polarizer array 2470 is controlled based on regions. The polarizer array 2470 includes a first region and a second region. Electrode layers of first liquid crystal cells and second liquid crystal cells of all polarization units in the first region in the polarizer array 2470 are connected to the power supply. Electrode layers of first liquid crystal cells and second liquid crystal cells of all polarization units in the second region in the polarizer array 2470 are disconnected from the power supply. The polarizer array 2470 is in the fourth state. When the polarizer array 2470 is in the fourth state, a light transmittance of the second region is less than a first threshold, that is, the second region is for light shielding. A light transmittance of the first region is greater than a second threshold, and the first region is for light transmission.

The audio circuit 2460 includes a speaker 2461 and a microphone 2462. The audio circuit 2460 may provide an audio interface between the user and the mobile phone.

In a possible design scheme, a function of the receiving module 2307 in FIG. 23 may be performed by the input unit 2430 in this example, functions of the control module 2304 and the processing module 2306 in FIG. 23 may be performed by the processor 2480 in this example, and the image collection module 2305 in FIG. 23 may be implemented by the camera 2450 in this example.

Any processor mentioned above may be a general-purpose central processing unit (CPU), a microprocessor, an application-specific integrated circuit (application-specific integrated circuit, ASIC), or one or more integrated circuits configured to control program execution in the wireless communication method in the first aspect.

An embodiment of this application further provides a computer-readable storage medium, and the computer-readable storage medium stores instructions. When the instructions are run on a computer, the computer is enabled to perform the method in the method embodiment corresponding to FIG. 12.

An embodiment of this application further provides a computer program product. When the computer program product runs on a computer, the computer is enabled to perform the method in the method embodiment corresponding to FIG. 12.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, to be specific, may be located in one position, or may be distributed on multiple network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods in embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A polarization-controllable method, applied to an electronic device comprising an optical lens, a power supply, and a polarizer array comprising multiple types of polarizers arranged in a same plane, an electrode layer of a first liquid crystal cell and an electrode layer of a second liquid crystal cell of the polarizer array are respectively connected to the power supply through a switch, and the polarizer array and the optical lens are sequentially disposed along a light incidence direction; the method comprising:
    passing light incident to the optical lens through the first liquid crystal cell and a first alignment film;
    passing light incident to the optical lens through the second liquid crystal cell and a second alignment film that is oriented differently from the first alignment film; and
    controlling the polarizer array to operate in a first state by controlling a state of connectivity between the electrode layer of the first liquid crystal cell and the power supply and a state of connectivity between the electrode layer of the second liquid crystal cell and the power supply, the polarizer array in the first state polarizing light that is incident to the optical lens in a first polarization direction based on orientation of the first alignment film, and
    controlling the polarizer array to operate in a second state by controlling a state of connectivity between the electrode layer of the first liquid crystal cell and the power supply and a state of connectivity between the electrode layer of the second liquid crystal cell and the power supply, the polarizer array in the second state polarizing light that is incident to the optical lens in a second polarization direction based on orientation of the second alignment film,
    to thereby controllably obtain polarized light in first and second different polarization directions.

2. The method according to claim 1, wherein controlling the state of the polarizer array by controlling the state of connectivity between the electrode layer of the first liquid crystal cell and the power supply and the state of connectivity between the electrode layer of the second liquid crystal cell and the power supply comprises:
    controlling multiple types of polarization units in the polarizer array to be in a half-on state, so that the polarizer array is in the first state, wherein controlling the half-on state comprises connecting in a same polarization unit, the electrode layer of the first liquid crystal cell of the polarization unit to the power supply, and disconnecting the electrode layer of the second liquid crystal cell from the power supply.

3. The method according to claim 2, wherein the method further comprises:
    receiving a first operation input and
    triggering the electronic device to enable a polarization imaging function in response to receiving the first operation input.

4. The method according to claim 2, further comprising:
    collecting a preview image;
    extracting an image feature of the preview image; and
    enabling a polarization imaging function based on the image feature.

5. The method according to claim 1, further comprising:
    when the polarizer array is in the first state, collecting image information of a target object in multiple polarization directions; and
    generating a polarized image based on the image information in the multiple polarization directions.

6. The method according to claim 1, wherein controlling the state of the polarizer array by controlling the state of connectivity between the electrode layer of the first liquid crystal cell and the power supply and the state of connectivity between the electrode layer of the second liquid crystal cell and the power supply comprises:
    controlling the electrode layer of the first liquid crystal cell and the electrode layer of the second liquid crystal cell to be disconnected from the power supply, so that the polarizer array is in the second state, wherein when the polarizer array is in the second state, a light transmittance of the polarizer array is less than a first threshold.

7. The method according to claim 1, wherein the state of the polarizer array further comprises a third state, and controlling the state of the polarizer array by controlling the state of connectivity between the electrode layer of the first liquid crystal cell and the power supply and the state of connectivity between the electrode layer of the second liquid crystal cell and the power supply comprises:
    controlling the electrode layer of the first liquid crystal cell and the electrode layer of the second liquid crystal cell to be connected to the power supply, so that the polarizer array is in the third state, wherein when the polarizer array is in the third state, a light transmittance of the polarizer array is greater than a second threshold.

8. The method according to claim 7, wherein the electronic device comprises a camera comprising the optical lens, and the method further comprises:
    receiving a second operation input,
    triggering use of the camera in response to the received second operation input; and
    controlling, based on the second operation input, the polarizer array to be in the third state.

9. The method according to claim 1, wherein the state of the polarizer array further comprises a fourth state, and the polarizer array comprises a first region and a second region; and controlling a state of the polarizer array by controlling the state of connectivity between the electrode layer of the first liquid crystal cell and the power supply and the state of connectivity between the electrode layer of the second liquid crystal cell and the power supply comprises:

controlling the electrode layer of the first liquid crystal cell and the electrode layer of the second liquid crystal cell in the first region to be connected to the power supply, and controlling the electrode layer of the first liquid crystal cell and the electrode layer of the second liquid crystal cell in the second region to be disconnected from the power supply, so that the polarizer array is in the fourth state, wherein when the polarizer array is in the fourth state, a light transmittance of the second region is less than a first threshold and a light transmittance of the first region is greater than a second threshold.

10. A polarization control apparatus comprising an optical lens, a power supply, and a polarizer array comprising multiple types of polarizers that are arranged in a same plane, an electrode layer of a first liquid crystal cell and an electrode layer of a second liquid crystal cell being respectively connected to the power supply through a switch, and the polarizer array and the optical lens are sequentially disposed along a light incidence direction, the first liquid crystal cell being optically coupled to a first alignment film, the second crystal cell being optically coupled to a second alignment film that is oriented differently from the first alignment film;

the polarization control apparatus further comprising a controller configured to control a state of the polarizer array by controlling a state of connectivity between the electrode layer of the first liquid crystal cell and the power supply and a state of connectivity between the electrode layer of the second liquid crystal cell and the power supply, wherein the state of the polarizer array comprises a first state, and when the polarizer array is in the first state, the polarizer array is configured to polarize light that is incident to the optical lens in a first polarization direction based on orientation of the first alignment film, the controller being further configured to control the state of the polarizer array to a second state, and when the polarizer array is in the second state, the polarizer array is configured to polarize light that is incident to the optical lens in a second polarization direction based on orientation of the second alignment film, to thereby obtain polarized light in first and second different polarization directions.

11. The polarization control apparatus according to claim 10, wherein the controller is further configured to:

control multiple types of polarization units in the polarizer array to be in a half-on state, so that the polarizer array is in the first state, wherein the half-on state is: in a same polarization unit, the electrode layer of the first liquid crystal cell is connected to the power supply, and the electrode layer of the second liquid crystal cell is disconnected from the power supply.

12. The polarization control apparatus of claim 10 wherein an inter-plane angle between the first alignment film and the second alignment film is in a range of [30°, 80°].

13. The polarization control apparatus of claim 10 wherein an inter-plane angle between the first alignment film and the second alignment film is in a range of [70°, 90°].

14. The polarization control apparatus of claim 10 wherein an inter-plane angle between the first alignment film and the second alignment film is in a range of [30°, 60°].

15. The polarization control apparatus of claim 10 wherein the multiple types of polarization units comprise a first polarization unit, a second polarization unit, a third polarization unit, and a fourth polarization unit, wherein an orientation of the first alignment film in the first polarization unit and an orientation of the first alignment film in the second polarization unit are at a first angle, the orientation of the first alignment film in the second polarization unit and an orientation of a first alignment film in the third polarization unit are at a second angle, the orientation of the first alignment film in the third polarization unit and an orientation of a first alignment film in the fourth polarization unit are at a third angle, and the first angle, the second angle, and the third angle are all angles in a clockwise direction or angles in an anticlockwise direction; and wherein the controller is configured to control a state of the polarizer array by controlling (a) a state of connectivity between an electrode layer of the first liquid crystal cell of the first polarization unit and the power supply, (b) a state of connectivity between the electrode layer of the second liquid crystal cell of the second polarization unit and the power supply, (c) a state of connectivity between an electrode layer of a third liquid crystal cell of the third polarization unit and the power supply, and (d) a state of connectivity between an electrode layer of a fourth liquid crystal cell of the fourth polarization unit and the power supply, to thereby configure the polarizer array to polarize light that is incident to the optical lens, to obtain polarized light in four different polarization directions.

16. The method of claim 1 wherein the inter-plane angle of the first liquid crystal cell is the same as the inter-plane angle of the second liquid crystal cell.

17. The polarization control apparatus of claim 10 wherein the inter-plane angle of the first liquid crystal cell is the same as the inter-plane angle of the second liquid crystal cell.

18. The method of claim 1 wherein:
passing light through the first liquid crystal cell does not pass light through the second alignment film; and
passing light through the second liquid crystal cell does not pass light through the first alignment film.

* * * * *